US009184998B2

(12) United States Patent
Xue

(10) Patent No.: US 9,184,998 B2
(45) Date of Patent: Nov. 10, 2015

(54) DISTRIBUTED PATH UPDATE IN HYBRID NETWORKS

(71) Applicant: QUALCOMM Incorporated, San Diego, CA (US)

(72) Inventor: Qi Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 13/827,338

(22) Filed: Mar. 14, 2013

(65) Prior Publication Data

US 2014/0269260 A1    Sep. 18, 2014

(51) Int. Cl.
  H04L 12/24    (2006.01)
  H04L 12/729   (2013.01)
  H04L 12/733   (2013.01)
  H04L 12/721   (2013.01)
  H04L 12/707   (2013.01)
  H04L 12/703   (2013.01)

(52) U.S. Cl.
  CPC ............ *H04L 41/12* (2013.01); *H04L 41/0654* (2013.01); *H04L 45/125* (2013.01); *H04L 45/20* (2013.01); *H04L 45/22* (2013.01); *H04L 45/28* (2013.01); *H04L 45/38* (2013.01)

(58) Field of Classification Search
  USPC .................................................. 370/225, 252
  See application file for complete search history.

(56) References Cited

U.S. PATENT DOCUMENTS 5,233,604 A    8/1993  Ahmadi et al.
5,995,503 A    11/1999 Crawley et al.
6,073,248 A    6/2000  Doshi et al.
6,888,842 B1 * 5/2005  Kirkby et al. ................ 370/414
6,973,023 B1   12/2005 Saleh et al.
7,103,640 B1 * 9/2006  Overton et al. ............... 709/217
7,327,683 B2   2/2008  Ogier et al.
7,725,035 B2   5/2010  Tyan et al.
7,869,382 B2   1/2011  Hamedi et al.
7,987,489 B2   7/2011  Krzyzanowski et al.

(Continued)

FOREIGN PATENT DOCUMENTS

CN    101237399 A    8/2008
CN    101980565 A    2/2011
WO    2011128002     10/2011

OTHER PUBLICATIONS

"IEEE P1905.1/D05 Draft Standard for a Convergent Digital Home Network for Heterogeneous Technologies", XP055047812. ISBN: 978-0-73-817434-1 Retrieved from the Internet: URL:http://ieeexplore.ieee.org/servlet/opac?punumber=6197675[retrieved on Dec. 13, 2012] May 5, 2012 , 82 pages.

(Continued)

*Primary Examiner* — Dang Ton
*Assistant Examiner* — Pamit Kaur
(74) *Attorney, Agent, or Firm* — DeLizio Law, PLLC

(57) ABSTRACT

A network condition prompts a hybrid device to select a new path for a packet stream. A path update may occur in response to a change in network topology or a traffic loading condition (e.g., congestion or saturation of a link in the current path). Path selections may be made at each hybrid device in the path from a source hybrid device to a destination hybrid device. A path update procedure may be dependent upon path selection procedures that are optimized for a hybrid network in which multiple hybrid devices may be utilized for a particular path. Path update for load balancing may be dependent upon whether a packet stream is elastic or non-elastic.

29 Claims, 13 Drawing Sheets

(56) References Cited

U.S. PATENT DOCUMENTS

| | | |
|---|---|---|
| 8,165,121 B1 | 4/2012 | Singh |
| 8,296,424 B2 | 10/2012 | Malloy et al. |
| 8,369,220 B1 | 2/2013 | Khanna et al. |
| 8,570,859 B1 | 10/2013 | Satapathy et al. |
| 2005/0111487 A1 | 5/2005 | Matta et al. |
| 2005/0128995 A1 | 6/2005 | Ott et al. |
| 2005/0232157 A1 | 10/2005 | Tyan et al. |
| 2005/0265255 A1* | 12/2005 | Kodialam et al. ............ 370/252 |
| 2006/0077918 A1* | 4/2006 | Mao et al. ..................... 370/310 |
| 2006/0182035 A1 | 8/2006 | Vasseur |
| 2007/0104215 A1 | 5/2007 | Wang et al. |
| 2007/0183317 A1* | 8/2007 | Vasseur et al. ............... 370/225 |
| 2008/0298250 A1 | 12/2008 | Larsson |
| 2009/0059814 A1 | 3/2009 | Nixon et al. |
| 2009/0067834 A1 | 3/2009 | Lu |
| 2009/0168653 A1 | 7/2009 | St. Pierre et al. |
| 2009/0238074 A1 | 9/2009 | Vasseur et al. |
| 2009/0303882 A1 | 12/2009 | Tanaka et al. |
| 2009/0316602 A1 | 12/2009 | Nandy et al. |
| 2010/0085916 A1 | 4/2010 | Yu et al. |
| 2010/0085948 A1 | 4/2010 | Yu et al. |
| 2010/0309912 A1 | 12/2010 | Mehta et al. |
| 2011/0064079 A1 | 3/2011 | Lim et al. |
| 2012/0176914 A1 | 7/2012 | Choudhury et al. |
| 2012/0207163 A1 | 8/2012 | Schrum |
| 2012/0224503 A1 | 9/2012 | Schrum, Jr. et al. |
| 2012/0230343 A1 | 9/2012 | Schrum, Jr. |
| 2012/0231828 A1 | 9/2012 | Wang et al. |
| 2012/0236726 A1 | 9/2012 | Shihada et al. |
| 2012/0236870 A1 | 9/2012 | Klein |
| 2012/0239794 A1 | 9/2012 | Klein |
| 2012/0257545 A1 | 10/2012 | Agha et al. |
| 2012/0320919 A1 | 12/2012 | Baliga et al. |
| 2012/0320924 A1* | 12/2012 | Baliga et al. ................. 370/400 |
| 2013/0024706 A1 | 1/2013 | Katar et al. |
| 2013/0044753 A1* | 2/2013 | Huang et al. ................. 370/392 |
| 2013/0114409 A1 | 5/2013 | Iovanna et al. |
| 2013/0121157 A1 | 5/2013 | Logvinov et al. |
| 2013/0132603 A1 | 5/2013 | Cohen et al. |
| 2013/0132604 A1 | 5/2013 | Cohen et al. |
| 2013/0138832 A1 | 5/2013 | Qi et al. |
| 2013/0188514 A1 | 7/2013 | Jain |
| 2014/0003336 A1 | 1/2014 | Padden et al. |

OTHER PUBLICATIONS

"PCT Application No. PCT/US2013/072639 International Search Report and Written Opinion", Mar. 5, 2014 , 13 pages.

"PCT Application No. PCT/US2013/072641 International Search Report", Mar. 24, 2014 , 11 pages.

Raniwala, et al., "Architecture and Algorithms for an IEEE 802.11—Based Multi-Channel Wireless Mesh Network", Infocom 2005. 24th Annual Joint Conference of the IEEE Computer and Communications Societies Proceedings IEEE. Miami, FL, USA, Piscataway, NJ, USA, vol. 3 XP010829112, DOI: 10.1109/INFCOM.2005.1498497, ISBN: 978-0/7803-8968-7 sections I and IV Mar. 13, 2005 , 12 pages.

Co-pending U.S. Appl. No. 13/828,776, filed Mar. 14, 2013, 65 pages.

Fedyk, et al., "IS-IS Extensions Supporting IEEE 802.1aq Shortest Path Bridging," Internet Engineering Task Force (IETF), Request for Comments: 6329, Apr. 2012, 37 pp.

Wikipedia, "IEEE 802.1aq (Redirected from Shortest Path Bridging)," retrieved from http://en.wikipedia.org/wiki/Shortest_path_bridging on Oct. 12, 2012, 13 pp.

"U.S. Appl. No. 14/089,086 Office Action", Jun. 5, 2015, 23 pages.

"PCT Application No. PCT/US2013/072639 Written Opinion", Mar. 5, 2015, 6 pages.

"PCT Application No. PCT/US2013/072641 Written Opinion", Mar. 6, 2015, 6 pages.

"U.S. Appl. No. 13/828,776 Office Action", Apr. 23, 2015, 30 pages.

Co-Pending U.S. Appl. No. 14/089,611, filed on Nov. 25, 2013, 85 pages.

Co-Pending U.S. Appl. No. 14/089,086, filed on Nov. 25, 2013, 88 pages.

Co-Pending U.S. Appl. No. 14/096,389, filed on Dec. 4, 2013, 86 pages.

"U.S. Appl. No. 14/089,611 Office Action", Jun. 25, 2015, 24 pages.

"U.S. Appl. No. 14/096,389 Office Action", Jun. 19, 2015, 36 pages.

* cited by examiner

DISTRIBUTED PATH UPDATE IN HYBRID NETWORKS

BACKGROUND

Embodiments of the inventive subject matter generally relate to the field of communication systems, and, more particularly, to updating paths for packet streams in a hybrid network.

Traditional routing or bridging protocols are capable of determining paths through particular networks. For example, IEEE 802.1aq defines a Shortest. Path Bridging (SPB) protocol for Ethernet networks. Other routing protocols may exist for other network technologies.

For a hybrid network, traditional routing and bridging protocols may be inefficient or unusable. Hybrid communication networks typically comprise multiple networking technologies (e.g., wireless local area network (WLAN) technologies, powerline communication technologies, Ethernet, etc.) that may be interconnected using bridging-capable devices that forward packets between devices utilizing the different network technologies and media in order to form a single extended communication network. The hybrid network can comprise hybrid devices and conventional (or legacy) communication devices. Moreover, the hybrid network may use multiple network technologies in a variety of topology configurations.

The complexity of hybrid networking has increased as a result of mixed network technologies and expanding topology options. Traditional methods for managing communications paths in a hybrid network are inadequate.

SUMMARY

Various embodiments are described for managing or updating paths for a packet stream in a hybrid network. In one embodiment, a network condition in a hybrid network is detected at a hybrid device. The network condition is associated with an impaired link between at least two devices in the hybrid network. A candidate stream that is using a current path that includes the impaired link is identified. A new path for the candidate stream is selected based, at least in part, on a position of the hybrid device in the current path.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
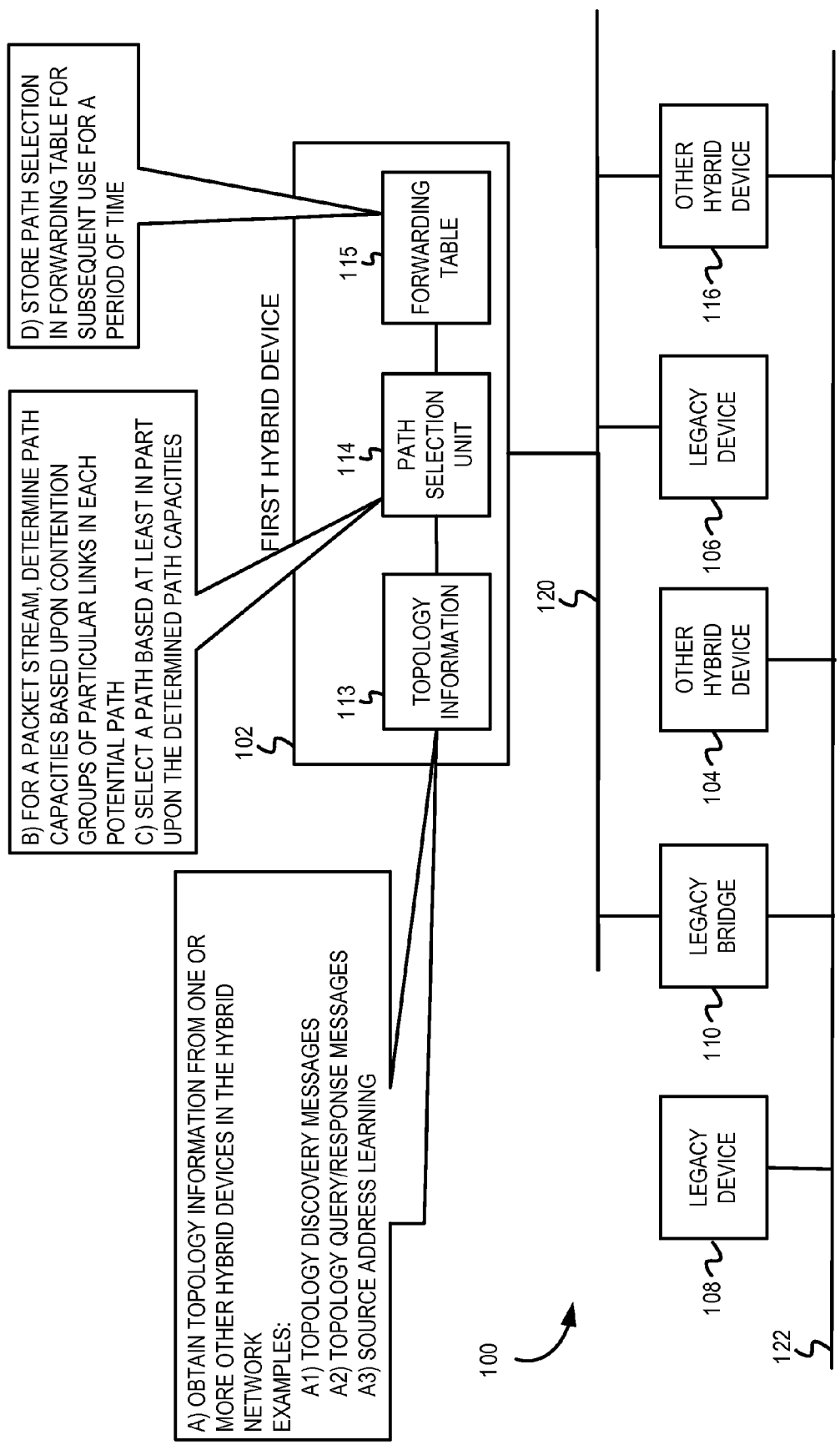
FIG. 1 is an example system diagram illustrating a process for path selection in a hybrid network.

The description that follows includes exemplary systems, methods, techniques, instruction sequences and computer program products that embody techniques of the present inventive subject matter. However, it is understood that the described embodiments may be practiced without these specific details. For instance, although in some embodiments the path selection and path update mechanism are described for example hybrid networks that include wireless local area network (WLAN) devices (e.g., IEEE 802.11 devices), powerline network devices (e.g., HomePlug AV) and Ethernet devices, in other embodiments the path selection and path update mechanisms can be implemented in hybrid networks that include other suitable types of network devices that implement other standards/protocols (e.g., WiMAX, etc.). In other instances, well-known instruction instances, protocols, structures and techniques have not been shown in detail in order not to obfuscate the description.

In some traditional networks, packet routing may be used to "route" packets of a packet stream via a homogenous network. Traditional routing may be performed at a network layer of a communications protocol stack. However, in a hybrid network (such as, for example, a home networking environment), some path selection and path update processes have been handled at a lower layer—specifically the media access control (MAC) layer. A hybrid device may gather topology information via a variety of MAC layer processes. For example, topology information may be gathered using broadcast topology messages, topology query and response messages, and/or source address learning. A hybrid device may utilize the topology information or other information about the hybrid network to select a path for a stream of packets being originated or forwarded by the hybrid device.

In this disclosure, a packet stream may be communicated via a hybrid network using a path from a first hybrid device (e.g., a source hybrid device) to a second hybrid device (e.g., a destination hybrid device). A path refers to one or more hops from a first hybrid device to a second hybrid device via a hybrid network. In this disclosure, a hop is defined as a communication from a first hybrid device to a second hybrid device via the same communication media and network segment without being bridged by a third hybrid device. For example, a one-hop path may refer to a single communications connection via a media directly coupling two hybrid devices. Because hops described in this document refer to hops between hybrid devices, a hop may also be referred to as a hybrid hop interchangeably.

A path may include two or more hops, such as when a relay hybrid device receives data from a first hybrid device and then relays (by retransmitting) the data to a second hybrid device.

A multi-hop path may or may not be related to a particular communications medium. For example, a first hop in a path may include a first communications medium (e.g., from a first hybrid device to a second hybrid device), while a second hop in the path may include a different communications medium (e.g., from the relay device to a second device). A multi-hop path may traverse different communication media, network segment, or via a third (relay) hybrid device. In this disclosure, a "next hop" refers to a communication to the next hybrid device in a path, such as a current next hop in a path that is made up of a plurality of hops. In some embodiments, each hybrid device may independently select a next hop for a packet stream based upon path selection logic.

In accordance with at least one embodiment of this disclosure, path selection and path update logic may be performed by a hybrid device while considering a full end-to-end path associated with a packet stream. In accordance with at least one embodiment of this disclosure, the path selection logic may also include calculating end-to-end path capacity for potential paths. The end-to-end path capacity may be based at least in part upon contention groups associated with shared media. Path groups may be created to bundle network paths prior to path selection. In one embodiment, a path group may include paths that are associated with a legacy bridge in the hybrid network. Contention groups, path groups, and various other concepts associated with the path selection mechanism will be further described below with reference to at least FIGS. 3-6. Selected paths may be recorded in a forwarding table for use with subsequent packets of a packet stream. The packet stream can be identified by stream identification information determined from the packets (such as a 5-tuple identifier based upon source address, destination address, source port, destination port, and protocol identifier).

Once a path is selected for a packet stream, subsequent packets for the packet stream follow the selected path. However, there may be conditions which would prompt a hybrid device to select a new path. A path selection update may occur, for example, in response to a change in network topology or a traffic loading condition (e.g., congestion or saturation of a link in the current path). Changes in link metrics (e.g., link capacity, medium utilization, buffer utilization rate, etc.) may prompt a path selection update at a hybrid device. Furthermore, because path selections may be made independently at each hybrid device in the path from a source hybrid device to a destination hybrid device, a path selection update may be dependent upon path update procedures that are optimized for a hybrid network in which multiple hybrid devices may be utilized for a particular path. Path update logic for various hybrid devices will be further described below with reference to at least FIGS. 7-9.

In some embodiments, a first hybrid device detects a network condition that prompts a path selection update. The network condition may be a topology change (such as a link failure at the first hybrid device, or a topology change notification from another hybrid device in the hybrid network). Alternatively, the network condition may be a change in link loading (such as congestion or saturation at a link in the current path, or a notification of changed link metrics reported by another hybrid device in the current path). In response to detecting the network condition, streams impacted by the network condition are identified. For example, impacted streams may be the streams that are associated with a path that includes a link that has failed. In one example, impacted streams are identified based upon protocol type (e.g., TCP or UDP) and a level of congestion or saturation associated with a link. Once streams are identified for path selection update, a new path is selected based upon an end-to-end path from the first hybrid device to the destination hybrid device. Load balancing, stream selection, and path update mechanisms, which will be further described below with reference to at least FIGS. 10-12, may be used to improve network conditions. A new path may be limited based on a maximum number of hops allowed for the packet stream through the hybrid network. Path selection update may also be dependent upon the type of traffic (e.g., TCP or UDP) and amount of congestion.

FIG. 1 is an illustration of an example hybrid network 100 to introduce various concepts associated with embodiments of the present disclosure. A hybrid network (such as a Convergent Digital Home Network (CDHN), or P1905.1 network) is typically formed by interconnecting communication networks (that support different communication protocols) across different network technologies and communication media. In this disclosure, a hybrid network may also be referred to as a hybrid communication network, a mixed communication network, or a hybrid home network. The hybrid network can include hybrid communication devices (referred to herein as "hybrid devices") that are often multi-interface and capable of operating across multiple networking technologies. A hybrid device (HD) may or may not have multiple interfaces but is considered a hybrid device if it is configured to use protocols associated with multi-interface devices in a hybrid network. The hybrid network can also include conventional, often single-interface, communication devices (referred to herein as "legacy devices") that are not configured to use hybrid device protocols.

In the example hybrid network 100, a first hybrid device 102 and other hybrid devices 104, 116 may have various network bridging capabilities. In some implementations, each hybrid device may support multiple interfaces using different networking technologies (i.e., Ethernet, IEEE 802.11, Coax, and powerline communications (PLC)). Furthermore, an interface that supports IEEE 802.11 may have different hardware capabilities (e.g., 2.4 GHz and/or 5 GHz support, dual band single radio, dual band dual concurrent, etc.). In this disclosure, WLAN may be used to refer to wireless local access network technology, including IEEE 802.11 and/or Wi-Fi™. It is noted that even though FIG. 1 does not explicitly show multiple communication interfaces for the hybrid devices 102, 104 and 116, the hybrid devices 102, 104 and 116 can comprise two or more communication interface that couple the hybrid devices to two or more communication networks. IEEE P1905.1 draft standard defines an abstraction layer (AL) for multiple home network technologies that provides a common interface to several popular network technologies: IEEE 1901 over power lines, IEEE 802.11 for wireless, Ethernet over twisted pair cable and MoCA 1.1 over coax. In this disclosure, a HD is considered P1905.1 compliant if it includes the IEEE P1905.1 abstraction layer and associated protocols. The abstraction layer typically has a unique medium access control (MAC) address that is in addition to the interface layer (IL) MAC addresses associated with each interface of the HD. The P1905.1 protocol defines messages, such as the Topology Discovery Message, Topology Query/Response messages, or other messages communicated between hybrid devices to share information about the topology of the hybrid network.

The example hybrid network 100 includes legacy devices 106, 108, 110. Legacy device 110 is a specialized legacy device that includes bridging capability, and is therefore referred to as legacy bridge 110. A legacy device (LD) is a device that operates using at least one of the underlying networking technology used in the hybrid network but which does not implement a home networking protocol associated with the hybrid network. For example, a legacy device may not implement the P1905.1 protocol, while hybrid devices implement the P1905.1 protocol. In some embodiments (such as legacy devices 106, 108), a legacy device supports only a single networking technology at a given time and has one connection to the hybrid network. In other embodiments (such as legacy bridge 110), a legacy device may include multiple physical interfaces; but because the legacy device does not have the P1905.1 abstraction layer, each physical interface is considered an independent end point in the hybrid network. A legacy device is not a hybrid device for purposes of network topology and discovery. The legacy device typically gains access to the hybrid network through a hybrid device. Typically, a legacy device (i.e., non-P1905.1) may be associated with a particular HD. In some topologies, the legacy device may have connectivity to more than one HD device that share a common communications medium with the legacy device.

In FIG. 1, the example hybrid network 100 includes two network segments 120 and 122. The network segment 120 is coupled with hybrid devices 102 and 116, and a legacy device 106. The network segment 122 is coupled with a hybrid device 104 and a legacy device 108. The legacy bridge 110 couples the network segment 120 and the network segment 122. It should be noted that hybrid device 116 includes at least two interfaces, one interface is coupled to network segment 120 and another interface is coupled to network segment 122. In other example networks, hybrid device 116 may include further interfaces, including more than one interface for a particular network technology.

In a hybrid network, multiple end-to-end paths may exist between a pair of communicating devices, especially if a path traverses more than one hybrid device. For example, a path through the hybrid network may traverse multiple networking devices in tandem via different network technologies for each hop. In the example hybrid network 100, a communication path from first hybrid device 102 to legacy device 108 may utilize first network technology (e.g., Ethernet) on network segment 120 and a second network technology (e.g., PLC) on network segment 122. In one path, the first hybrid device 102 may use a two-hop path from first hybrid device 102 (as a source hybrid device) to hybrid device 116 (as a relay hybrid device), and from the hybrid device 116 to hybrid device 104 (as a destination hybrid device). Various examples of one-hop paths and two-hop paths are described in subsequent figures; however, it is noted that hybrid networks may include paths with three or more hops.

In some embodiments of this disclosure, the selection of a path through the hybrid network may be improved by having accurate topology information. With accurate topology information, a hybrid device may select a more efficient path for routing or forward packets in the hybrid network. A topology map that includes the relative locations of legacy devices and hybrid devices in the hybrid network allows for better path selection and path update logic. For example, the hybrid devices may implement protocols to improve network performance by evenly dividing the communication load over multiple paths. In addition to topology information, a hybrid device may collect link status information (such as capacity, utilization, etc.) associated with various devices connected to a communications segment in the hybrid network.

In the example hybrid network 100, each of the hybrid devices 102, 104, and 116 can broadcast topology protocol messages to advertise their presence in the hybrid network 100. For example, the hybrid device 102 can broadcast a topology discovery message (e.g., at predetermined periodic time intervals) comprising an identifier of the hybrid device 102 to announce its presence in the hybrid network 100 to the hybrid device 116.

The hybrid device 102 comprises memory for storing topology information 113, a path selection unit 114, and memory for storing a forwarding table 115. Path selection, path reselection, and path update procedures may be performed by path selection unit 114. Likewise, although not depicted in FIG. 1, the hybrid devices 104 and 116 can also comprise their respective topology information, memory, and path selection units. Also, although not depicted in every figure, it should be understood that the various hybrid devices may include one or more processing units and program instructions stored in memory, and the one or more processing units configured to execute the program instructions to implement, at least in part, the path selection and path update mechanisms described herein.

In one embodiment, a hybrid device should maintain, for each interface of the hybrid device, a list of connections to other hybrid devices and legacy devices located in the hybrid network. For each legacy device in the topology, the hybrid device may determine which hybrid devices have a local connection to the legacy device. Therefore, a topology map based on topology information for a hybrid network may be useful to determine the paths to both hybrid devices and legacy devices.

At stage A, the first hybrid device 102 may gather topology information from one or more other hybrid devices in the hybrid network. The topology information may be obtained using a variety of processes. While several examples are provided in this description, a person of skill in the relevant art would readily conceive of alternatives for gathering topology information in a hybrid network. In some implementations, conventional methods of gathering topology information in non-hybrid networks may also be used to gather topology information for a hybrid network.

At example stage A1, topology discovery messages may be broadcast by each hybrid device (either periodically or in response to a detected change in topology). In IEEE P1905.1 draft standard, topology discovery messages are periodically sent on each physical interface. The topology discovery messages are broadcast or multicast onto a network segment (e.g., media) and can be interpreted by a neighboring P1905.1-compliant device which has an underlying interface communicatively connected to the network segment. Topology discovery messages are typically not re-transmitted, so they are useful in determining direct neighbor hybrid devices. In this disclosure, such direct neighbor hybrid devices may be referred to one-hop neighbors. A topology discovery message from other hybrid device 116 is detected by the first hybrid device 102 to prompt the first hybrid device 102 to gather additional topology information.

At example stage A2, topology query/response messages may be exchanged between hybrid devices to request and receive additional topology information. For example, in response to the topology discovery message from other hybrid device 116 detected at first hybrid device 102, the first hybrid device 102 may send a topology query message to the hybrid device 116 to request information about further hybrid devices or legacy devices discovered by hybrid device 116. The hybrid device 116 may indicate in a topology response message (responsive to the topology query message) that it has discovered another hybrid device 104 via network segment 122. The first hybrid device 102 may then send a topology query message to the other hybrid device 104 to obtain further topology information.

At example stage A3, another way in which topology information may be obtained is through source address learning. As traffic is received at an interface, the hybrid device can build a list of legacy devices that may be reachable via that interface. Typically the list may include addresses (e.g., MAC addresses) for the devices that have sent packets observable at that interface.

Numerous other examples for gathering topology information may be available. In addition to the examples described above, other messages may be used to gather topology information. For example, Topology Notification Messages defined in IEEE P1905.1 draft standard may be used to indicate changes to the topology to neighboring or associated hybrid devices. Topology Notification Messages are similar to topology discovery messages, but they are relayed by each hybrid device to neighboring hybrid devices, and they contain more information regarding the originator of the topology notification messages. It should be understood that information from other protocols may also be used in gathering information about the existence or locations of various devices. For example, Link Metric Query/Response messages may be used to gather additional information about media type, link capacity, link utilization, etc.

At stage B, the first hybrid device 102 may have a packet stream to communicate to a second hybrid device or a legacy device that is associated with the second hybrid device. The first hybrid device 102 may begin by identifying potential paths to the second hybrid device based upon the topology information. The path selection unit 114 may calculate path capacities for various potential paths. The first hybrid device 102 may determine path capacities based upon contention groups of particular links in each potential path. In one embodiment, the path capacities are based on end-to-end path capacities from source device to destination device. Contention groups may be defined to more accurately calculate the end-to-end path capacities. Contention groups are used to analyze paths that traverse the same communication medium more than once. Contention groups are described in FIG. 4. The path selection unit 114 may also define available path groups (APGs) so that groups of paths may be compared as a set. Available path groups are used to analyze groups of paths which share a common legacy bridge. APGs are described in FIG. 5.

At stage C, a path is selected based on a path selection mechanism. An example path selection mechanism (which may also be referred to as an algorithm, process, or logic, in some embodiments) is described in FIG. 6. At stage D, the selected path may be stored in the forwarding table 115 for subsequent use. For example, once a path is selected for a particular packet stream, subsequent packets for the packet stream utilize the same path unless a network condition prompts a change. If a network condition prompts a change, a path update mechanism may be used, such as path update mechanisms (i.e., algorithm, process, or logic) described in FIGS. 7-9.

Figure 2:
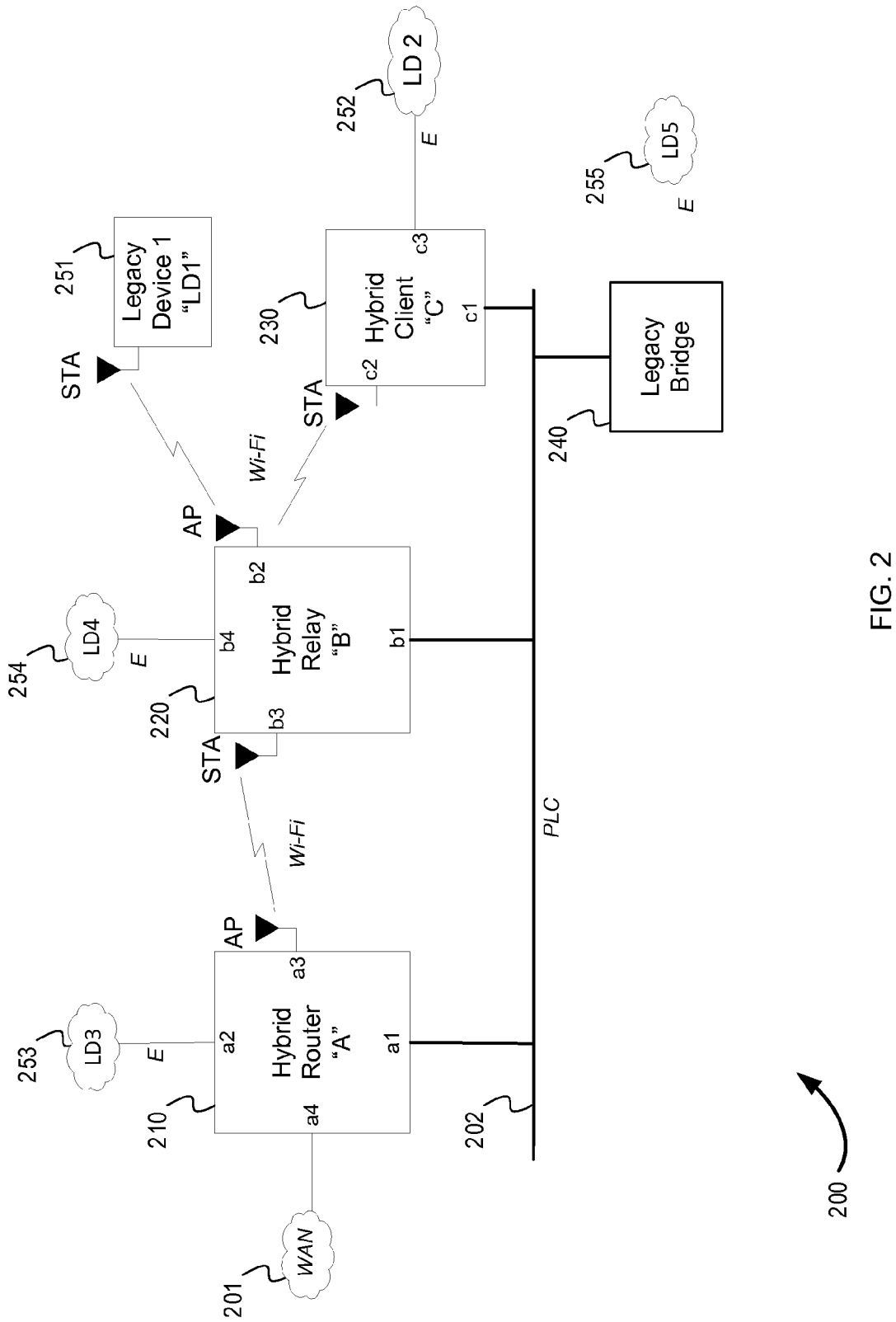
FIG. 2 is an example system diagram illustrating an example multi-hop hybrid topology in a hybrid network.

FIG. 2 is another example hybrid network 200 showing a slightly more complex arrangement to introduce the concept of paths associated with a hybrid network. In FIG. 2, the hybrid network 200 includes a hybrid router 210 (designated as "A" for reference purposes only), a hybrid relay 220 (designated as "B"), a hybrid client 230 ("C"), a legacy bridge 240, and legacy devices 251, 252, 253, 254, 255. Hybrid router 210 is coupled via interface A(a4) to a WAN 201. As a form of shorthand, when referring to a particular interface on a particular device the device is listed with a parenthetical to reflect the interface. Therefore, A(a1) refers to the interface "a1" of hybrid device "A." It should be understood that this shorthand is used for illustrative purposes only to aid the reader in understanding this disclosure and is not meant to limit a particular implementation.

In this example topology, hybrid router 210 has an interface A(a1) coupled to a PLC network 202, an interface A(a2) coupled to an Ethernet network, and an interface A(a3) that is a WLAN Access Point (AP) interface. Hybrid relay 220 has an interface B(b1) coupled to the PLC network 202, an interface B(b3) that is a WLAN Station (STA) interface connected to WLAN AP interface A(a3), an interface B(b4) coupled to an Ethernet interface, and an interface B(b2) that is a WLAN AP interface. The hybrid relay 220 is a relay hybrid device.

Hybrid client 230 has an interface C(c1) coupled to the PLC network 202, an interface C(c2) that is a WLAN STA interface connected to WLAN AP interface B(b2), and an interface C(c3) coupled to an Ethernet network.

From the perspective of hybrid router 210 there may be several potential paths to other hybrid devices. For example, a path from hybrid router "A" 210 to hybrid client "C" 230 may include a one hop path via the PLC network 202. Another example path from hybrid router "A" 210 to hybrid client "C" 230 may include a two hop path via the hybrid relay "B" 220 device, where the two hop path includes a first hop from A(a3) to B(b3) and a second hop from B(b2) to C(c2). A shorthand for this path might be A(a3)++B(b3)*B*B(b2)++C(c2) where "++" is used to indicate a hop in the path and "*" is used to indicate bridging by a device.

Upon examining the topology of example hybrid network 200, hybrid router "A" may become aware of the following example paths to hybrid relay 220 (noted as "B") and hybrid client 230 (noted as "C"):

Via A(a1):
one-hop path to B {A(a1)++B(b1)}
two-hop path to B {A(a1)++C(c1)*C*C(c1)++B(b1)}
two-hop path to B {A(a1)++C(c1)*C*C(c2)++B(b2)}
one-hop path to C {A(a1)++C(c1)}
two-hop path to C {A(a1)++B(b1)*B*B(b2)++C(c2)}
two-hop path to C {A(a1)++B(b1)*B*B(b1)++C(c1)}
Via A(a3):
one-hop path to B {A(a3)++B(b3)}
two-hop path to C {A(a3)++B(b3)*B*B(b2)++C(c2)}
two-hop path to C {A(a3)++B(b3)*B*B(b1)++C(c1)}

In addition to the paths identified, the hybrid router 210 may also gather and store information about link capacities, media type, and utilization associated with each of its local interfaces and each remote interface of hybrid relay 220 and hybrid client 230. This information may be stored with the topology information or in other storage medium. As shown in subsequent figures, path capacities may be calculated using the paths identified from the topology information as well as the link/interface information.

Figure 3:
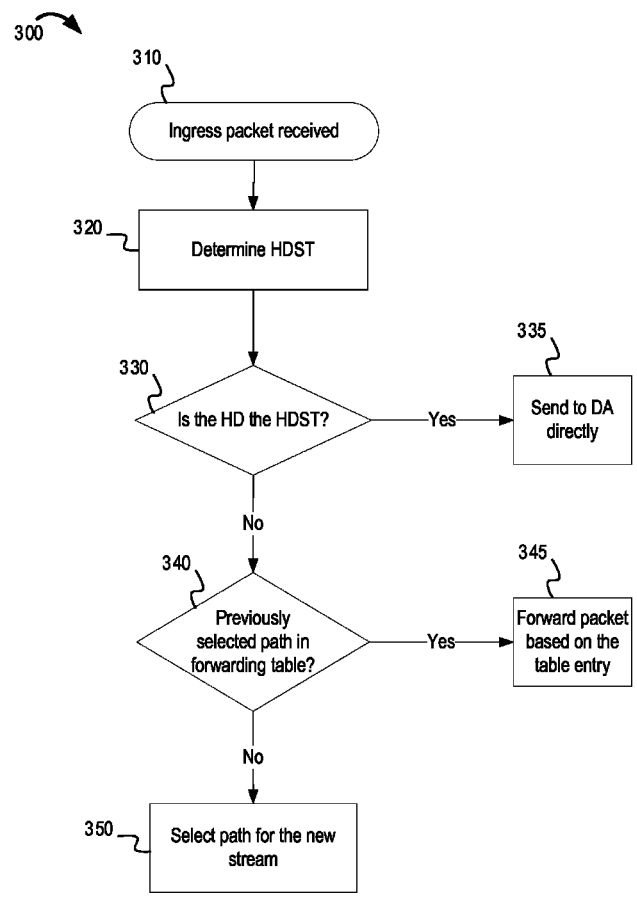
FIG. 3 is a flow diagram illustrating example operations for packet processing in a hybrid network.

FIG. 3 is a flow diagram illustrating example operations 300 for packet processing in a hybrid network. At 310, a hybrid device receives an ingress packet associated with a packet stream. At 320, the hybrid device inspects the packet to determine a destination hybrid device (HDST) closest to the destination address of the packet. For example, for a destination address associated with a legacy device, the hybrid device determines which hybrid device is associated with the destination legacy device. For example, the hybrid device may consult topology information or may utilize protocol to locate the legacy device. At 330, if the hybrid device that received the ingress packet is the destination hybrid device (either a packet addressed to the hybrid device itself or to a legacy device that is a neighbor of the hybrid device), then at 335, the hybrid device processes the packet by sending it to the destination address (DA) directly.

If the hybrid device is not the destination hybrid device, then the packet may be forwarded to a remote destination hybrid device. At 340, the hybrid device checks a forwarding table to see if there is a previously selected path in the forwarding table for the destination hybrid device. For example, if the forwarding table contains an entry with the stream identification information (e.g., 5-tuple of source address, destination address, source port, destination port, and protocol) then, at 345, the packet is forwarded according to the path information associated with the entry. If the forwarding table does not have an entry for the stream identification information, then at 350 a new path is selected. The packet may be associated with a new stream. A path selection process is used by the hybrid device to select the next hop based on an end-to-end path capacity.

Path selection refers to a decision by a hybrid device regarding the next hop (also referred to as a "forwarding decision" or "route") for a packet to a destination. In some embodiments, each hybrid device independently performs path selection for incoming packets at each hybrid device. In other embodiments, a first hybrid device may perform path selection and inform a second hybrid device (e.g., a downstream hybrid device) of a path selection. Once a path is selected for a particular application stream, a hybrid device may continue to utilize the selected path (e.g., forwarding decision to next hop) until detecting a network condition change, such as a topology change or a link metric change. Path reselection may also be performed for load balancing either periodically or in response to a network condition change. Each incoming packet includes stream identification information (e.g., source address, destination address, port address, protocol) which allows a hybrid device to identify the incoming packet as belonging to an existing stream which already has a selected path or to a new stream which requires a new path selection. The hybrid device maintains a forwarding table with path selection information about each existing stream. The forwarding table may include the stream identification information, information about the path selected (also referred to as forwarding decision information), and may store other information regarding the stream (e.g., stream data rate, prioritization information, stream medium utilization, etc.). Path selections in the forwarding table may be removed if a predetermined time period elapses without receiving an incoming packet for a particular stream.

Path selection can be made on a per stream basis by each hybrid device. Therefore, in some embodiments, a hybrid device may not instruct path decisions downstream. For example, a first hybrid device receives an incoming packet and makes a forwarding decision based upon end-to-end path characteristics about the path from the first hybrid device to the destination device. If there is a second hybrid device in the path, then when the second hybrid device receives the incoming packet, the second hybrid device may independently make a path selection about the next hop from the second hybrid device to the destination device. While independent path selections may not be directly coordinated between the first and second hybrid devices, the hybrid devices may make forwarding decisions based upon known hybrid network paths and path characteristics. In other words, each hybrid device may utilize end-to-end path characteristics as described herein to make similar path selections.

In other embodiments, a first hybrid device may perform path selection for a new packet stream and inform one or more other hybrid devices about the selected path. For example, the first hybrid device may inform a second hybrid device about a selected path for the packet stream. Informing the second hybrid device may include an instruction about packet forwarding and/or may include information about the end-to-end path associated with the packet stream.

Before path selections are performed, a hybrid network may determine hybrid network paths to each destination device based upon topology information (sometimes also referred to as a topology map) of the hybrid network. The topology map can be used for determining the forwarding role that a particular hybrid device will use for a packet in a new stream. The topology map may be useful in gathering link metrics for each available path and determining end-to-end path metrics that take into account contention-based networks in the path. In addition, locations of legacy bridging devices may be discovered and recorded in the topology map. During path selection, an end-to-end path metric may be grouped with other paths that utilize the same legacy bridging device since the route taken by the legacy bridging device may be unpredictable. Therefore, path selection described in this disclosure can accommodate a variety of hybrid network topologies and end-to-end path characteristics. Features of path selection are described in more detail in FIGS. 4-6.

Topology map listings may also be used to store bridging capabilities of the hybrid devices, and link metric information about the links between hybrid devices. For example, a link metric protocol (e.g., P1905.1 Link Metric Query/Response Messages) is used to gather link metric information from the hybrid devices in the hybrid network. Each hybrid device measures link metrics for the local interfaces, and the link metric information may include link media type, link data rate (LR), medium availability (MA), packet drop rate (PDR), and buffer utilization (BU). A first hybrid device can query a second hybrid device (e.g., via a Link Metric Query Message) to obtain the link metrics for interfaces at the second hybrid device. The second hybrid device can report the link metrics (e.g., via a Link Metric Response message) so that the first hybrid device has the link metric information about the interfaces at the second hybrid device. The Link Metric Response message may include some or all of the link metric information determined at the responding hybrid device. The Link Metric Query/Response protocol may be performed periodically, in response to a network change, or when a new path selection is prompted by an incoming packet.

In a topology map, the link may be represented by a pair of interfaces at directly connected neighbors. For example, the link from interface a1 on hybrid device A to the interface b1 on hybrid device B may be represented as the link A(a1)++B (b1). In an example implementation, the link data rate (LR) may be defined as the maximum goodput (bps) at the MAC layer, after protocol overheads, for a link, e.g., A(a1)++B(b1). It should be noted that in some embodiments the link data rate is measured by each of HD A and HD B, so that the link metric is "directional" and specific to the interface on each device. For example, HD B will measure the link data rate of interface b1 for the link to A(a1), and will report the link data rate to HD A. The HD A will measure the link data rate of interface a1 for the link to B(b1) and will report the link data rate to HD B. In the example implementation, medium availability (MA) may represent the percentage of time the medium is available for an interface to transmit or receive. Note that MA of an interface A(a1) may be inversely correlated to medium utilization (MU). MU may be defined as the percentage of time the medium is occupied by existing traffic and hence unavailable for new traffic. Packet Drop Rate (PDR) of an interface may be defined as the number of packets dropped at the interface compared to the number of total packets sent to the interface by a higher layer (such as the abstraction layer of P1905.1 draft standard). Buffer Utilization (BU) may be defined as the amount of buffer utilized for a particular interface. It should be understood that the link metrics may also be different for different MAC priorities. For example, an interface may support multiple priorities and have different values of MA, PDR, and BU based on each priority for a particular interface.

Based on the link metrics reported by other hybrid devices, the first hybrid device can calculate directional link capacity for each interface and for each priority. For example, a link capacity LC for the link from A(a1)++B(b1) may be defined as the link rate LR of the link times the medium availability MA measured at A(a1). The link capacity is therefore a directional link capacity for a link from a first interface of a first hybrid device to a second interface of a second hybrid device. The link capacities for each link in the topology map can be determined in a similar way.

The topology map (or other memory storage) may also include information about the type of medium used for each link. This may be useful, for example, when calculating capacity for an end-to-end path. In traditional routing protocols, a path capacity may only account for the minimum link capacity of all the links in the path. However, for some types of contention-based medium, it may be necessary to account for the effects of the shared medium. For example, powerline communications (PLC) and WLAN portions of a network may use the same medium more than once in the path from a source to a destination device. Conventional shortest path algorithms, such as Djikstra's algorithm (as used by most link-state routing protocols) fail to account for the effects of shared medium when calculating the path cost. An end-to-end path metric takes into account contention groups associated with shared media as well as unpredictable network conditions caused by legacy bridges in the hybrid network. In this disclosure, a next hop of a path associated with an application stream is selected based upon end-to-end path metrics associated with hybrid network paths.

Figure 4:
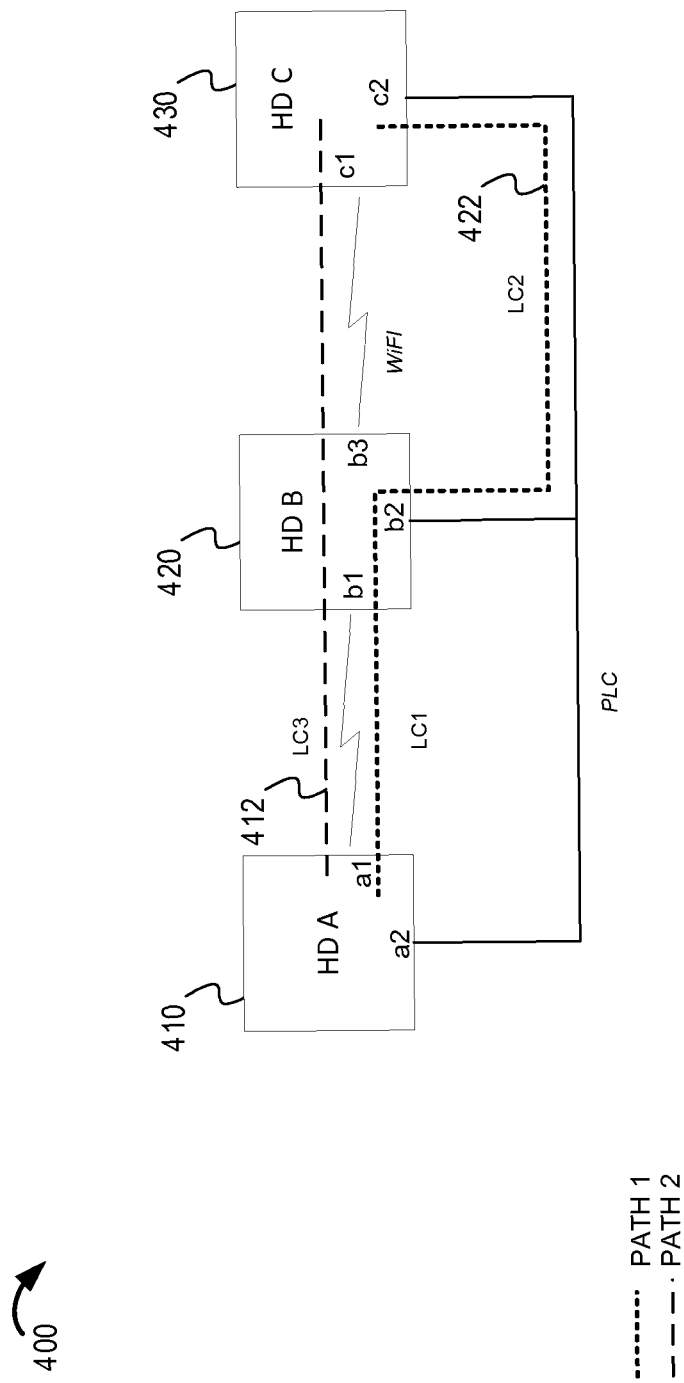
FIG. 4 is another example system diagram illustrating example operations associated with determining path capacities based on contention groups in a hybrid network.

FIG. 4 is another example system diagram illustrating example operations associated with determining path capacities based on contention groups. In FIG. 4, an example network 400 includes a hybrid device 410 ("A") that has an interface A(a1) with a WLAN link to interface B(b1) of hybrid device 420 ("B"). Hybrid device 410 also has an interface A(a2) to a PLC network. Hybrid device 420, in addition to the B(b1) interface to a WLAN link to A(a1), has an interface B(b2) to the PLC network and B(b3) to another WLAN link to interface C(c1) of hybrid device 430 ("C"). The example network may include multiple paths between hybrid device 410 and hybrid device 430 via the hybrid device 420, as shown in FIG. 4. Various paths may include a mix of WLAN links and/or PLC links.

Of the various paths from hybrid device 410 to hybrid device 430, in this example, two paths are described to highlight the effect of "self-contention" due to shared medium. A first path 422 utilizes the path {A(a1)++B(b1)*B*B(b2)++C (c2)}. A second path 412 utilizes the path {A(a1)++B(b1) *B*B(b3)++C(c1)}. The link capacity "LC1" may be defined as the link capacity from A(a1) to B(b1). The link capacity "LC2" may be defined as the link capacity from B(b2) to C(c2). The link capacity "LC3" may be defined as the link capacity from A(a1) to B(b1). To simplify the example, assume that LC1=LC2=LC3 and can be referred to as LC. In FIG. 4, hybrid device 410 has a packet destined for hybrid device 430 (or a legacy device that is a neighbor of hybrid device 430). The hybrid device 410 is comparing two potential paths (path 1 and path 2). For path 1, the hybrid device 410 would transmit via WLAN in a first hop to the hybrid device 420 and would expect the hybrid device 420 to retransmit the packet via PLC in a second hop to the hybrid device 430. The first and second hops utilize different medium which are independent of each other. Therefore the end-to-end path capacity is the lower of LC1 and LC2. Since the hypothetical uses LC=LC1=LC2, then the end-to-end path capacity is LC.

Next, the hybrid device 410 calculates the end-to-end path capacity for path 2. For path 2, the hybrid device 410 would transmit via WLAN in a first hop to the hybrid device 420 and would expect the hybrid device 420 to retransmit the packet via WLAN in a second hop to the hybrid device 430. The first and second hops utilize the same medium so the effective capacity of the second hop will be reduced due to the effect of the transmission in the first hop. Due to the effect of self-contention over the shared medium, the link capacity of each hop is effectively reduced by half (LC/2). Therefore the end-to-end path capacity for path 2 is at most LC/2.

To account for the effect of self-contention between links over a shared medium, link capacity may be calculated based on contention groups. It should be understood that an end-to-end path may have more than one contention group. Each contention group is determined based upon links in a path that share the same transmission medium. For example, all PLC links in a path are included in a contention group. All WLAN links that share the same frequency and channel are included in a contention group. Furthermore, if a legacy bridge is located between two hybrid devices in a path, the links through the legacy bridge may be combined to a contention group for the purposes of determining path capacity. The contention group that includes the legacy bridge may utilize the same link metric value as the first hop link, or may use the lowest link metric values of either the first hop or second hop through the legacy bridge. Finally, for links that are not already in a contention group for links in WLAN, PLC, or legacy bridges, the individual links are added to separate contention groups having only each individual link. Therefore, each path from a source to a destination will be made up of a plurality of contention groups. To define the contention groups, in one embodiment the following parameters may be considered: (a) all links within the same contention group interfere with each other; (b) links in different contention groups do not interfere with each other.

Once contention groups are identified and defined for each path, the end-to-end path capacity ($PC_{e2e}$) for a particular path can be defined as the minimum contention group capacity for the path. For each contention group, the contention group capacity is equal or smaller than the minimum link capacity of the links in the group. The contention group capacity generally decreases as the number of links in the group increases.

Reference is made to an example calculation for determining the end-to-end path capacity ($PC_{e2e}$) for a particular path:

$$PC_{e2e} = \min_i \{LC_{G\_i}\}$$

where i is each contention group in the path, and $LC_{G\_i}$ is the link capacity associated with the contention group i.

The link capacity associated with a contention group may be determined (e.g., calculated) based upon maximum theoretical throughput (sometimes also referred to as bandwidth or achievable bandwidth) possible using the group of links in the contention group. If the links in the contention group have different link rates (e.g., bit rates or throughput rate), then in some embodiments the contention group capacity may be lower than or equal to the lowest link rate among the links in the contention group. In some examples, the contention group capacity may take into account the media utilization or media availability (e.g., the minimum media availability of the links in the contention group). In some examples, the contention group capacity may also be reduced based upon expected overhead associated with each of the links in the contention group. There may be numerous other examples of calculating capacity for a group of links in a contention group that shares a common communication media.

It should be understood that the examples for determining end-to-end path capacity and contention group capacity are only examples. Other calculations may be used to determine end-to-end path capacity and/or contention group capacity. In some implementations, the contention group capacity is determined based on media availability (or link utilization) for the media which is common for the links in the contention group as well as the relative link rates of the links in the path that share the media. In other implementations, the contention group capacity may be determined by comparing link metric information for one or more links in the contention group with a lookup table that identifies expected contention group capacity based on a quantity of links in the contention group.

Figure 5:
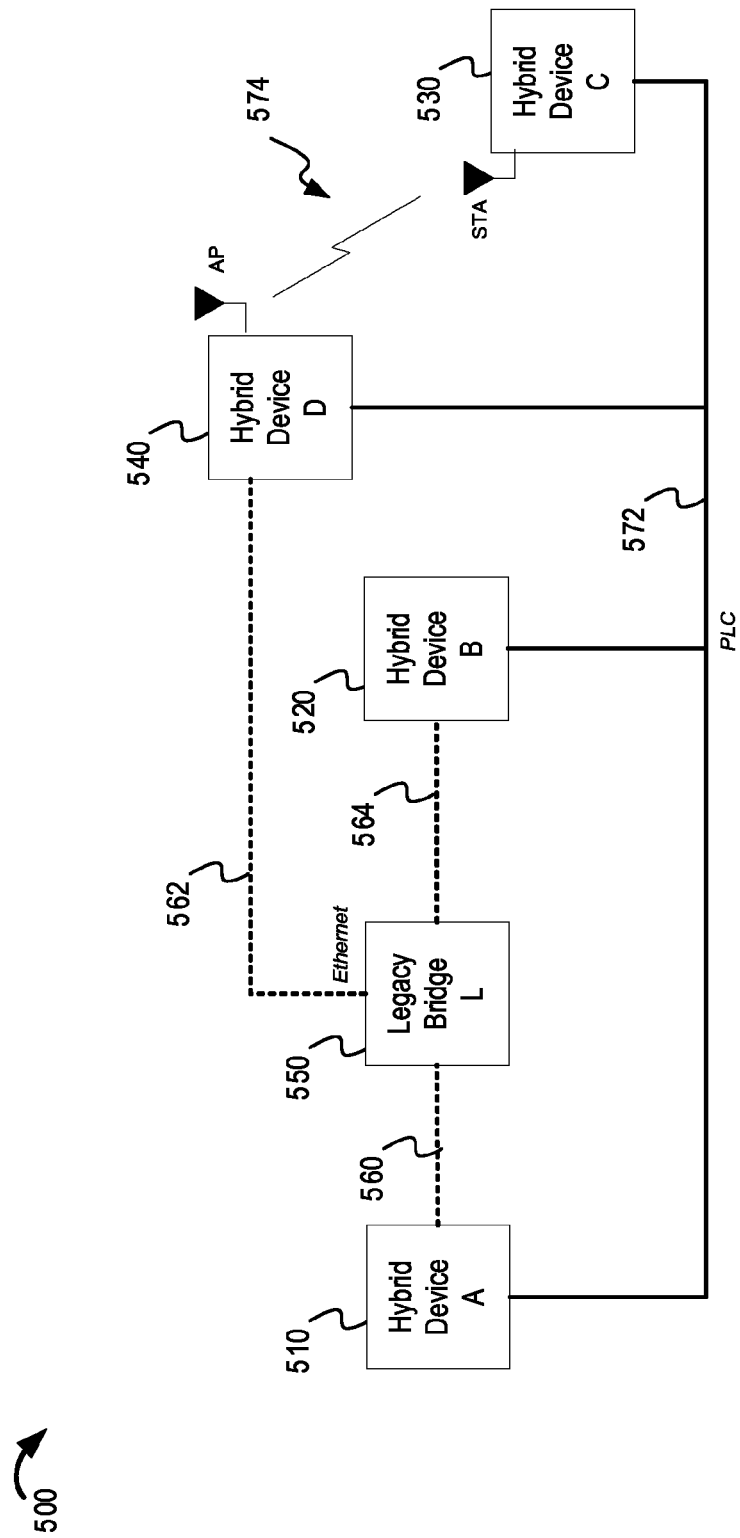
FIG. 5 is another example system diagram illustrating example operations associated with determining available path groups in a hybrid network.

FIG. 5 is another example system diagram illustrating example operations associated with determining available path groups in an example hybrid network 500. Another tool to account for unique topologies in the hybrid network is the creation of available path groups (APG). Available path groups can be defined to group paths through the hybrid network prior to path selection. In an example topology, an available path group can be used to group two or more paths that traverse through a legacy bridge to different hybrid relays in the network.

For example, in FIG. 5, a hybrid device A 510 may have traffic destined to hybrid device C 530. A first potential path from HD A 510 to HD C 530 may include an Ethernet link 560 to legacy bridging device (L) 550, which sends the traffic via Ethernet link 564 to HD B 520, and the HD B 520 sends the traffic via PLC 572 to the HD C 530. A second potential path from HD A 510 to HD C 530 may include an Ethernet link 560 to the same legacy bridging device L 550, which sends the traffic via Ethernet 562 to a HD D 540, and the HD D 540 sends the traffic via WLAN 574 to the HD C 530. Both the first path and the second path traverse the same legacy bridging device L 550. Due to the header field limit in an Ethernet frame, from the perspective of HD A 510 the first path and the second path both have the same destination address (the HD C 530) even though both paths traverse the legacy bridge L 550. The capacity of the WLAN 574 connection may be higher or lower than the capacity of the PLC 572. However, HD A 510 cannot determine which path the legacy bridging device L 550 may use for the second hop. This means that end-to-end path capacity may be unpredictable.

To compare potentially unpredictable paths such as the first and second potential paths described above, the HD A 510 may group the first path and the second path as an available path group (APG). For purposes of comparing potential paths, the APG will have an end-to-end path capacity ($PC_{APG}$) determined based upon the path capacities of the paths grouped in the APG. For example, the end-to-end path capacity for the APG ($PC_{APG}$) may be related to the lowest of the path capacities of the paths in the APG. In the example above, if the WLAN 574 link capacity was lower than the PLC 572 link capacity, then it is possible that the second potential path capacity is lower than the first potential path capacity. For purposes of comparison, both the first and second potential paths are grouped together as an available path group having the $PC_{APG}$ defined as the path capacity of the second potential path. For each path, the contention groups are defined and a path capacity is calculated.

It should be understood that APGs can be defined such that all paths from a first hybrid device to a destination device can be included in one APG. Each one-hop path will be a separate APG. Paths that have more than one hop are combined to an APG if they connect to different hybrid relays via a legacy bridge and have the same destination hybrid device (or a neighbor device of the same destination hybrid device). Remaining paths may be included in separate APGs defined for each remaining path for the purposes of comparing APGs.

Figure 6:
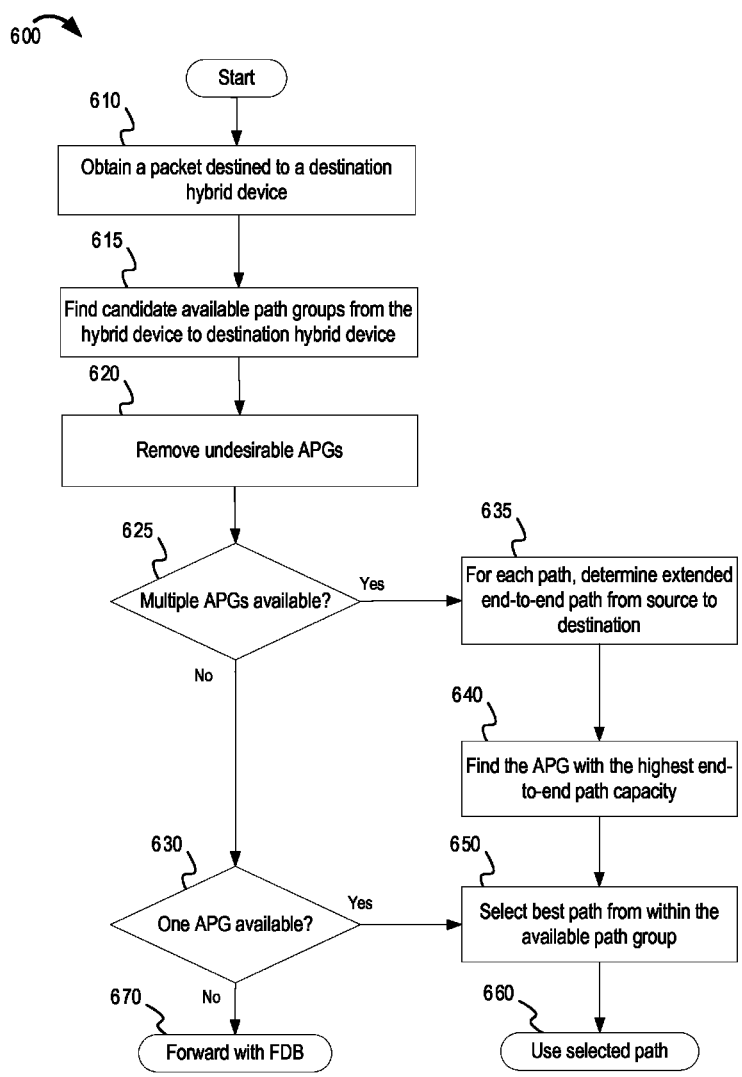
FIG. 6 is a flow diagram illustrating example operations for path selection in a hybrid network.

FIG. 6 is a flow diagram illustrating example operations 600 for a path selection associated with a new packet stream. In FIG. 6, beginning at 610, a hybrid device obtains a packet destined to a destination hybrid device. For example, the hybrid device may receive an incoming packet on a first interface of the hybrid device. Alternatively, the packet may be received from an upper layer of the hybrid device. Upon inspecting the packet, the hybrid device determines which remote destination hybrid device is associated with the destination address of the packet (e.g., the destination address is either the destination hybrid device or a legacy neighbor of the destination hybrid device). At 615, the hybrid device finds candidate available path groups from the hybrid device to the destination hybrid device. By reviewing the topology map, the hybrid device identifies which destination hybrid device has a relationship to the destination address. The hybrid device searches for all paths from the first hybrid device to the destination hybrid device. The paths may include bridged interfaces or legacy bridging devices. It should be noted that the destination address may be the address of another hybrid device or the address of another hybrid device that has a neighbor relationship to a destination legacy device. Also, there may be multiple destination hybrid devices that have interfaces with a neighbor relationship with the destination address, in which case the process is repeated until all potential paths are identified. The paths may then be grouped to determine candidate APGs. In the case where multiple destination hybrid devices have a neighbor relationship to a destination legacy device, the process of determining paths and APGs may be repeated for each destination hybrid device having the destination legacy device as a neighbor.

At 620, after determining candidate APGs, the list of candidate APGs may be reduced by removing APGs with undesirable paths. For example, if the hybrid device has another existing stream with the same destination address as the current packet, then the hybrid device may remove any APGs having a path using a same egress interface as an existing stream, but a different next hop hybrid device. This is to prevent to packet streams destined to the same destination address from traversing two different relay hybrid devices via the same egress interface. For example, this "destination address (DA) constraint" is imposed so that all packets having the same DA and same egress interface must use the same next hop IL MAC.

In an implementation, the APGs which have more than two hops may be removed from consideration. Furthermore, if the first hybrid device is a relay hybrid device (it has received the incoming packet from an upstream hybrid device and the DA is a downstream hybrid device), the first hybrid device may remove APGs that have more than one hop. It is anticipated that in the hybrid network environment, no path through the hybrid network should require more than two hops. In other implementations, larger number of hops may be allowed. If multiple APGs remain, the first hybrid device may remove APGs based on hop count so that one-hop paths are preferred over multi-hop paths. Furthermore, APGs with two-hop paths in which a relay device has more than one path to the DA may be preferred over APGs with a two-hop path in which the relay device has only one path to the DA. It should be noted that these filtering criteria may be optionally implemented and combined in various orders.

At 625, the hybrid device determines if multiple candidate APGs remain after removing APGs with undesirable paths. If multiple APGs are not available, the process continues to block 630. If multiple APGs are available, then the process continues to block 635. At 635, for each path of each remaining APG, the first hybrid device determines an extended end-to-end path capacity $PC_{e2e}$ for each path from the source to the destination. An APG path capacity may be determined based upon the lowest $PC_{e2e}$ of the paths included in the APG. The $PC_{e2e}$ may also consider the effects of contention groups—including contention groups that may include the ingress interface of the hybrid device processing an incoming packet (e.g., if the ingress interface uses the same media type as a next hop in the path). Furthermore, the contention group may be extended to include a link to a destination legacy device if the packet is destined to a legacy device and the destination hybrid device utilizes the same media to connect to the legacy device as the last hop to the destination hybrid device. The link capacity for the legacy links (either the link from the source legacy device to the first hybrid device, or the link from the destination hybrid device to the destination legacy device) may be estimated based upon the link capacity of another link in the contention group. The extended $PC_{e2e}$ is calculated for all paths in the APG, and then the lowest extended $PC_{e2e}$ is used as the $PC_{APG}$. At 640, the APG with the highest $PC_{APG}$ is selected. In the event that multiple candidate APGs have the same APG path capacity, then ties may be broken based upon hop count, priority numbers, randomly, or a consistent algorithm.

At 650, once the APG has been selected, if there are multiple paths in the APG, the first hybrid device may select the path in the APG that has the highest extended $PC_{e2e}$. If necessary, ties between multiple paths may be broken (e.g., by hop count). The path defines the egress interface of the first hybrid device as well as the next hop IL MAC of the next hybrid device in the path. At 660, the selected path is used to forward packets in the stream. The forwarding table is updated to include the stream identification information, the egress interface, and the next hop IL MAC address.

At 630, the hybrid device determines if one candidate APGs remains available. If there is a candidate APG available, then at 650, the hybrid device selects the path in the APG that has the highest extended $PC_{e2e}$ as described above. If at 630, there are no available APGs, the process continues to 670. At 670, the incoming packet may be forwarded based on a traditional forwarding database (e.g., based on address learning for a particular interface). This might occur, for example, when the destination address is a legacy device connected via a legacy network at a local interface of the hybrid device.

Figure 7:
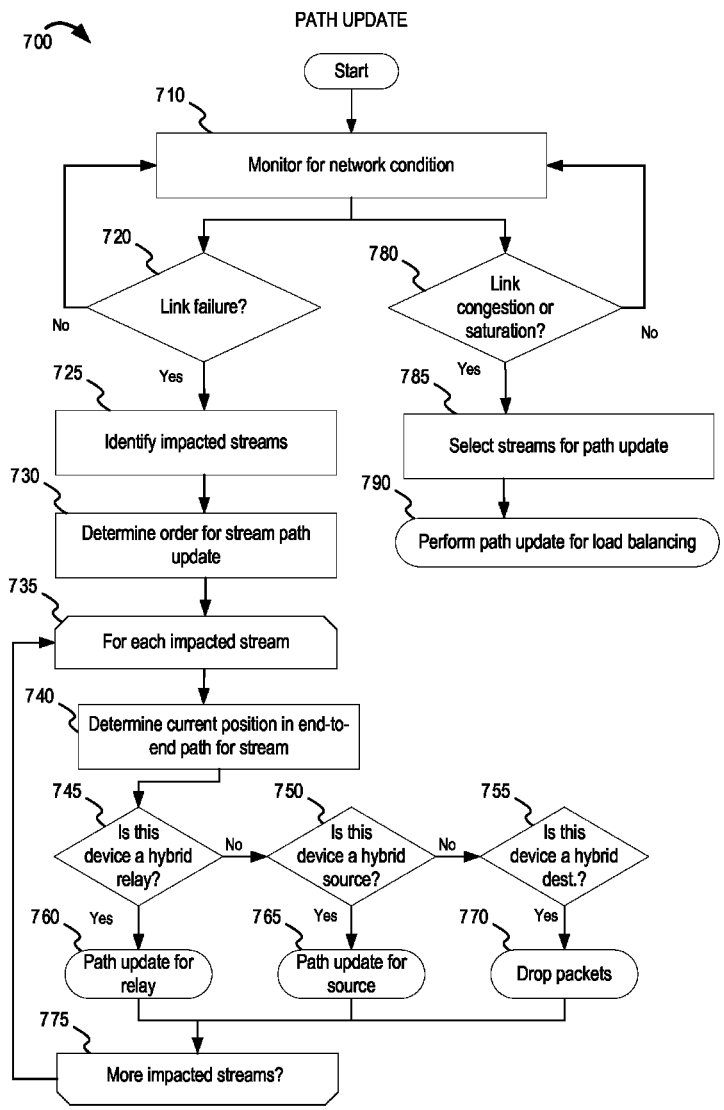
FIG. 7 is a flow diagram illustrating example operations for triggering a path update in a hybrid network.

FIG. 7 is a flow diagram illustrating example operations 700 for triggering a path update in a hybrid network. There may be conditions which would prompt a hybrid device to initiate a path update associated with selecting a new path for a packet stream. A path update may occur, for example, in response to a change in network topology or a traffic loading condition (e.g., congestion or saturation of a link in the current path). At block 710, the hybrid device monitors for a network condition that might trigger a path update.

At 720, one network condition that may prompt a path update is a link failure. A link failure may be detected based upon either a network discovery protocol or link interface characteristic. For example, if a network discovery protocol requires periodic topology discovery messages from direct peers, and the topology discovery message for a direct peer fails to be detected within a threshold time period, a hybrid device may assume that a link to the direct peer has failed. In P1905.1 draft standard, direct hybrid neighbors exchange topology discovery messages periodically. If a topology discovery message is not received on an interface within a timeout period, the links associated with the interface may have failed. Other events that indicate link failure include a disassociation event on a WLAN interface or detection that an Ethernet cable has been unplugged from an Ethernet interface. Alternatively, a link failure may be determined based upon link capacity or some other link metric falling below a predefined threshold (e.g., LC falling below a predefined threshold on a PLC interface). Upon determining a local link failure, a hybrid device will trigger a path update in response to the local link failure, and will send a topology notification message to other HDs in the hybrid network so that they may also consider a path update in response to the link failure. The topology notification message may, for example, trigger a path selection update at an upstream hybrid device that receives the topology notification message from a downstream hybrid device having a link failure in the current path.

If a link failure is detected at 720, then at 725 impacted streams are identified based upon the topology map and location of the link failure. For example, for a local link failure, a hybrid device checks its forwarding table to find all the impacted streams whose forwarding decision (egress IL MAC and next hop IL MAC) matches the failed link. For a link failure reported in a topology notification message from a second hybrid device, a first hybrid device determines existing streams from the first hybrid device that can no longer be relayed by the second hybrid device. Note that if the destination for a stream is either the second hybrid device (or a neighbor of the second hybrid device), then path update is not performed for that stream—packets will continue to be sent to the second hybrid device if possible, or dropped if the link failure is between the first hybrid device and the second hybrid device. However, where the second hybrid device is a hybrid relay to a third hybrid device, then the first hybrid device analyzes the topology change to determine whether there is another one-hop link from the second hybrid device to the third hybrid device. If there is another one-hop link from the second hybrid device to the third hybrid device, then path update is not performed for that stream. Otherwise, the first hybrid device determines that the second hybrid device cannot relay packets of the stream from the first hybrid device to the third hybrid device, and in response the first hybrid device identifies the stream as impacted.

Once the impacted streams are identified, at 730 the first hybrid device determines an order in which to move (also referred to as redirect, path switch, or path update) the streams to new selected paths. In an example implementation, the path updates of the impacted streams are performed one by one based on order of priority or class of service (e.g., per PCP/DSCP of the stream). Streams having the same priority or class of service may be ordered based on protocol type (e.g., UDP streams may be moved before non-UDP streams). Lastly, if multiple streams have the same priority or class of service and the same protocol type, the streams may be ordered based upon stream data rate (e.g., streams with higher stream data rate (SDR) may be scheduled before streams with lower SDR). Once the streams are ordered, the path update mechanism may be performed for each stream one at a time so that the effects of a path update can be calculated before performing a next path update for a next stream.

Operations from block 735 to block 775 may be used for each impacted stream in the ordered list of impacted streams. From block 735, the flow continues to block 740. The path update logic is slightly different depending on whether the path update is performed by a relay hybrid device, a source hybrid device, or a destination hybrid device. At block 740, the hybrid device determines its current position in the end-to-end path for the stream. In an example hybrid network topology, paths may be limited by two hops, which could include three hybrid devices in the path. In other network topologies, more than two hops may be allowed. The examples provided herein are based upon a two-hop maximum, but the concepts can easily be extrapolated to paths with larger hop maximums.

At 745, if the hybrid device is a relay hybrid device in the current path, then a path update process for hybrid relays is performed at 760. The path update process for hybrid relays is described in FIG. 9. If the hybrid device is not a relay hybrid device, then at 750, if the hybrid device is a source hybrid device in the current path, a path update process for source hybrid devices is performed at 765. The path update process for source hybrid devices is described in FIG. 8. If the hybrid device is not a relay hybrid device or a source hybrid device, then it may be a destination hybrid device. At 755, if the hybrid device is a destination hybrid device, then path update may not be possible. If the link failure is associated with a link to the destination address, then packets are simply dropped (at 770) at the destination hybrid device. Continuing with the link failure routine, if there are additional impacted streams at 775, the process returns to block 735 for the next impacted stream in the ordered list of impacted streams.

Returning to the top of FIG. 7, another network condition that may prompt a path update is a change in link metrics or a traffic condition. When a change in link metrics or traffic condition is detected, a path update may be triggered for load balancing. During the runtime of each HD, the HD continuously monitors the condition of its interface and measures the local link metrics information periodically. Based on the measured link metrics values, a link may be identified as congested or saturated. At 780, if a link is congested or saturated, then at 785 a process to select candidate streams for path update is initiated. The process for selecting candidate streams for path update is described in FIG. 10. At 790, a path update procedure to move or redirect one or more selected candidate streams is initiated.

Figure 8:
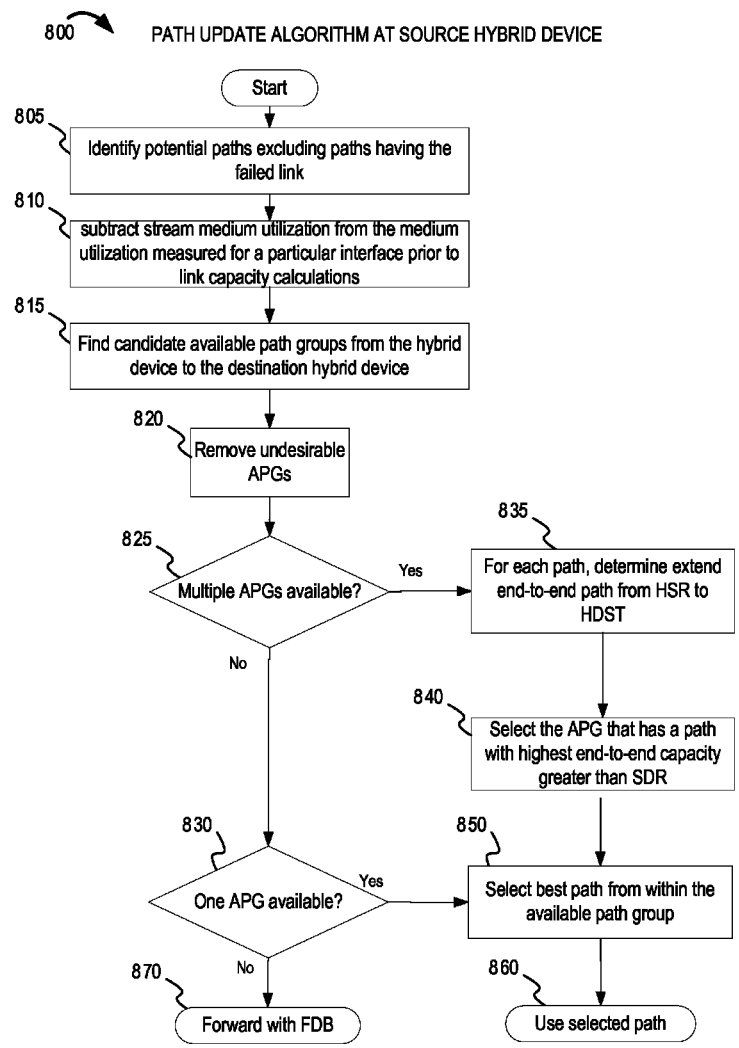
FIG. 8 is a flow diagram illustrating example operations for path update at a source hybrid device in a hybrid network.

FIG. 8 is a flow diagram illustrating example operations 800 for path update at a source hybrid device which is either generating traffic for a destination device or is retransmitting traffic from a legacy neighbor to the destination device. The first hybrid device determines a destination address based upon the destination address of a destination hybrid device (or the address of a destination hybrid device that has a direct neighbor relationship to the destination device). FIG. 8 shows an example flowchart (i.e., logic) for selecting a new path for an existing packet stream.

In FIG. 8, a source hybrid device is selecting a path for an incoming packet received on a first interface of the first hybrid device. The first hybrid device determines all paths from the first interface of first hybrid device to the destination address (DA). The destination address may be the address of another hybrid device or the address of another hybrid device that has a neighbor relationship to a destination legacy device. At 805, the first hybrid device determines all paths to the destination address, including paths which traverse bridging hybrid devices or bridging legacy devices. Paths which have the failed link will not be included as potential paths.

In the scenario where the path update was triggered by a topology notification message, the first hybrid device may be an upstream hybrid device that is upstream in the path from the hybrid device that detected the link failure. While paths that include the failed link are removed from consideration, it is possible that the newly selected path may continue to use the same egress interface of the first hybrid device. To make sure that the paths are compared accurately, when calculating the path capacity for each path, at 810 the stream media utilization (SMU) associated with the stream is subtracted from the media utilization (MU) of the interface that carries the current path.

Blocks 815-870 function similarly to operations 615-670 described in FIG. 6. At 815, candidate available path groups are defined. At 820, undesirable APGs are removed from further consideration. At 825, the hybrid device determines if multiple candidate APGs remain after removing APGs with undesirable paths. If there are not multiple APGs available, the process continues to block 830. If there are multiple APGs available, then the process continues to block 835. At 835, the extended end-to-end path capacities are calculated for paths from the source hybrid device (HSR) to the destination hybrid device (HDST). At 840, the APG having a path with the highest end-to-end capacity is selected. It should be noted that in this figure, path update will only be permitted if the selected APG has an extended end-to-end path capacity greater than the current stream data rate (SDR) associated with the existing stream. In other words, an existing stream will not be moved to a new path unless the new path is capable of carrying the stream data rate associated with the existing stream. At 850, the hybrid device selects the best path from the selected APG, and uses the selected path at 860. Similar to FIG. 6, at 830, the hybrid device determines if one candidate APGs remains available. If there is a candidate APG available, then at 850, the hybrid device selects the path in the APG that has the highest extended $PC_{e2e}$ as described above. If at 830, there are no available APGs, the process continues to 870. At 870, the hybrid device may forward the packets based on the traditional forwarding database. Because this path update is performed for an existing packet stream, and triggered based upon link failure, it is possible that packets will be dropped if no link is available to carry the egress packet.

Figure 9:
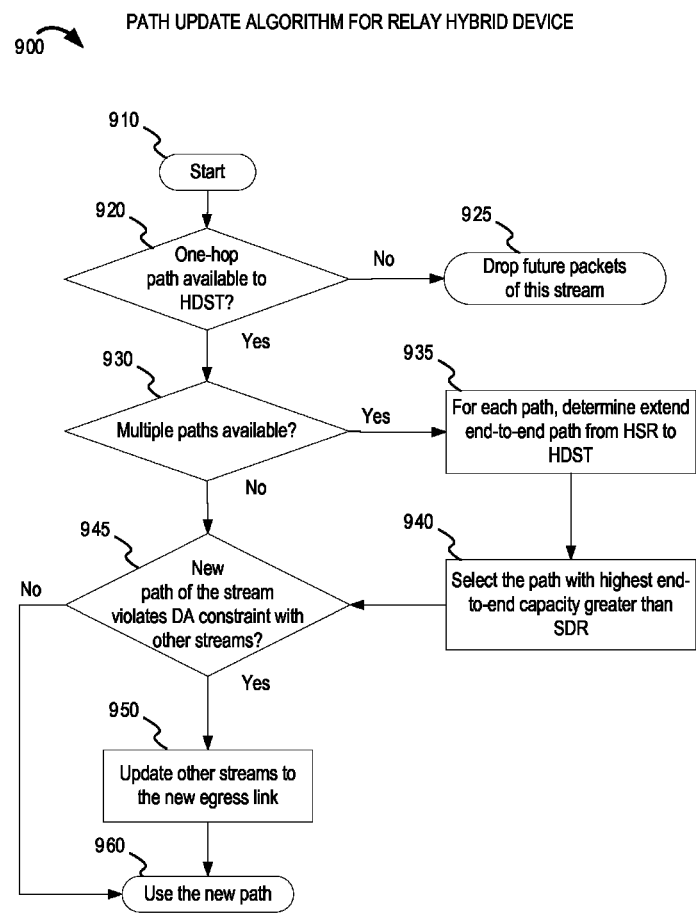
FIG. 9 is a flow diagram illustrating example operations for path update at a relay hybrid device in a hybrid network.

FIG. 9 is a flow diagram illustrating example operations 900 for path update at a relay hybrid device. In FIG. 9, the example path update is performed by a relay hybrid device which is relaying traffic from an upstream source hybrid device to a downstream destination hybrid device. In some implementations, due to the imposed two hop maximum in the example topology, a relay hybrid device will only consider one-hop paths to the destination hybrid device. This is because a previous hop has already occurred in the path (from the upstream hybrid device to the relay hybrid device). It is noted that other examples may utilize a higher maximum hop count in which case the relay hybrid device may calculate the number of previous hops to determine the hop count limit for remaining candidate paths.

At 920, the hybrid device (relay hybrid device) determines if there are any one-hop paths to the destination hybrid device (one less hop than the maximum two-hop limitation in the current example). In the example of a two-hop maximum, at 925 the relay hybrid device will drop packets for the stream if there is no alternative one-hop path to the destination hybrid device. One reason for dropping packets (rather than rerouting to a further relay hybrid device) is to avoid potential loops in the hybrid network. It is assumed that the source hybrid device can perform path reselection.

At 930, if multiple one-hop paths are available from the relay hybrid device to the destination hybrid device, then at 935 the relay hybrid device determines the path capacity associated with end-to-end path from the source hybrid device (HSR) to the destination hybrid device (HDST). It is noted that the path is extended to include the link capacities of upstream links in the path—this is done so that comparison of the available paths is based upon end-to-end path capacity. At 940, the relay hybrid device will select the path with the smallest hop count among end-to-end paths and which have a calculated end-to-end path capacity greater than the stream data rate (SDR) of the stream being moved. Alternatively, if there are multiple paths having the same hop count and calculated end-to-end path capacity greater than the SDR of the stream being move, then the relay hybrid device will select the path with the largest end-to-end path capacity.

At 945, the relay hybrid device determines whether the newly selected path for the stream violates the DA constraint with other existing streams. It is noted that if the new forwarding decision ("egress IL MAC" and "next hop IL MAC") of the stream violates the "DA constraint" with other streams at relay hybrid device for the interface identified by the "egress IL MAC", at 950 the relay hybrid device will also update the "next hop IL MAC" of the other streams to the "next hop IL MAC" of the stream. The DA constraint may be an implementation-specific policy imposed so that all packets having the same DA and same egress interface must use the same next hop IL MAC. This happen if the relay hybrid device is a relay for some streams to the destination hybrid device, but it is also a source hybrid device for other streams using two-hop paths to the destination hybrid device. Once a new path has been selected the new path is used to forward further packets for the stream at 960.

Figure 10:
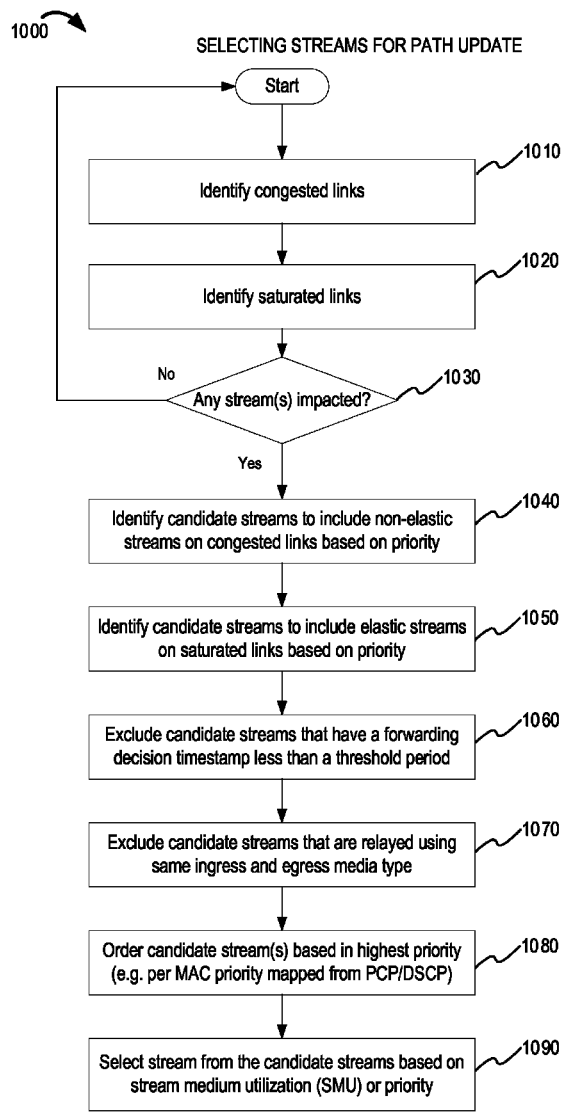
FIG. 10 is a flow diagram illustrating example operations for selecting one or more streams for path update in a hybrid network.

FIG. 10 is a flow diagram illustrating example operations 1000 for selecting one or more streams for path update based on load balancing. A path update may be prompted to load balance as a result of a change in link metrics or traffic condition. In FIG. 10, the example logic is used to identify a load balance requirement and select candidate streams to update paths in response to the load balance requirement. During normal operation, each hybrid device will monitor the condition of its interface and measure the local link metrics information periodically. Based on the measured link metrics values, the following link states may be defined for each interface (and per MAC priority):

Congested: interface overloaded by non-elastic streams (UDP protocol) which leads to high packet drop rates. Interface congestion is detected if a packet drop rate (PDR) exceeds a predefined link congested threshold (e.g., 5%)

Saturated: interface saturated by elastic streams (TCP protocol). When a link is saturated, only elastic streams are impacted. Interface saturation is detected if the PDR is below a threshold level, and medium utilization (MU) is above a predefined link saturation threshold (e.g., 70% medium utilization) and the buffer utilization (BU) is above a predefined buffer saturation threshold (e.g., 70% buffer utilization)

Normal: neither congested nor saturated.

In one embodiment, the link metrics (PDR/MU/BU) are collected per MAC priority. Therefore, the interface state is per MAC priority. The high priority streams on the interface may not be impacted even if the interface is congested or saturated for low priority streams.

At 1010, the hybrid device determines if there are any congested links. At 1020, the hybrid device determines if there are any saturated links. In one embodiment, triggered notification may be used to identify congested or saturated links. In one embodiment, a monitory agent may periodically check the packet drop rate, medium utilization and buffer utilization associated with each local link. At 1030, the hybrid device determines whether any streams are impacted by congested or saturated links. If no streams are impacted, the hybrid device continues to monitor for congested or saturated links.

Upon detecting interface congestion or saturation, the hybrid device will try to resolve the congestion or saturation by moving the impacted streams to another path. Unlike link failure scenario, the hybrid device may only move an impacted stream if a better path is available (given the stream data rate on the current path). In this disclosure, the streams are identified as elastic if they are using TCP and non-elastic if they are using UDP. The identification of candidate streams is based upon the link state (e.g., congested or saturated) and the type of streams impacted (e.g., elastic or non-elastic). At 1040, candidate non-elastic streams that are impacted by a congested link are identified based on priority. For example, if an interface is congested for MAC priority n, then existing non-elastic (UDP) streams with a priority value n (or higher, numerically) are included in the list of candidate streams. At 1050, candidate elastic streams that are impacted by a saturated link are identified based on priority. For example, if an interface is saturated for MAC priority n, then existing elastic (TCP) streams with a priority value n (or higher, numerically) are included in the list of candidate streams to move. The priority numbers may be based upon a mapping of PCP/DSCP values in higher layer headers to the MAC priority values. Typically MAC priority 0 is the highest priority in a hybrid network.

In some embodiments, there may be a delay (e.g., a configurable delay) between moving or redirecting a stream away from a transmission medium due to an oversubscription event and re-measuring medium utilization of the transmission medium. The delay may be desirable to allow sufficient time for new measurements after a stream is moved or redirected such that updated data/statistics will be used and the transmission medium will not be incorrectly determined to still be oversubscribed based on older data/statistics. At 1060, to prevent the frequent moving of streams and allow time for link metrics to be recalculated, a hold-down time might be used. For example, a forwarding decision timestamp may be included for each entry in the forwarding table. When identifying candidate streams to move for load balancing, only streams whose forwarding decision timestamp is greater than a minimum time period (e.g., 5 seconds) are considered, in one embodiment.

At 1070, any candidate streams that have been identified at 1040 and 1050 are excluded if they are relayed using the same ingress and egress media type. In an implementation, a relay hybrid device may determine that the ingress network segment is the same as the egress network segment for a stream. Upon determining that the relay hybrid device has congestion or saturation for the same interface handling the ingress and egress network segment, the relay hybrid device may refrain from performing a path update. As an example, if a stream is using WLAN as in ingress interface and WLAN as an egress interface, the hybrid device may exclude that stream from the list of candidate streams to reselect a new path The congestion or saturation on the impaired network segment should be detected by the upstream source hybrid device on the impaired network segment (prior to the relay hybrid device). A relay hybrid device refrains from performing the path update in this scenario so that the upstream hybrid device may perform a path update.

At 1080, once candidate streams are identified based upon the congestion or saturation condition and the type of streams, the hybrid device determines an order in which to move the streams to new selected paths. In one example, the determination of order may be made similar to that described previously. At 1090, a stream is selected from the candidate streams. For example, the stream with the highest priority may be selected first. For streams having the same priority, streams with higher stream medium utilization (SMU) or higher stream data rate (SDR) may be scheduled before streams with lower SMU or lower SDR. Once one or more streams are selected, the path update is performed on the selected stream(s) in order.

Figure 11:
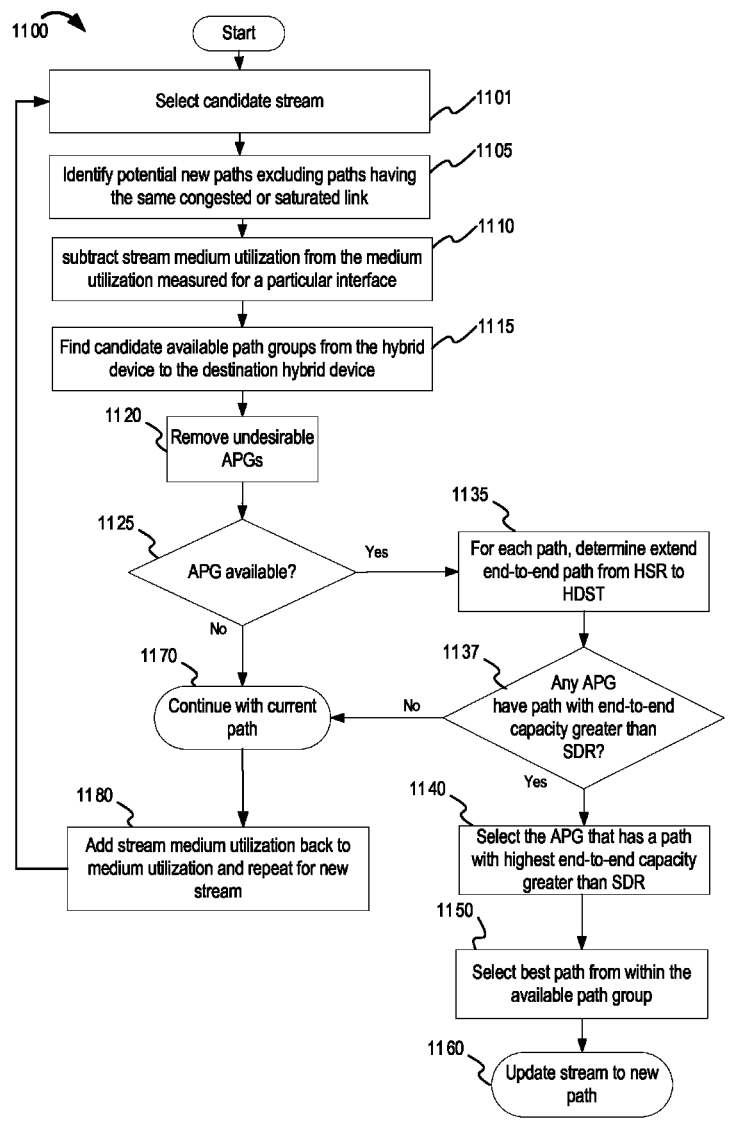
FIG. 11 is a flow diagram illustrating example operations for path update based upon load balancing in a hybrid network.

FIG. 11 is a flow diagram illustrating example operations 1100 for a path update performed due to a congested or saturated link network condition. The operations 1100 may be performed iteratively for each selected candidate stream. Several of the example operations 1100 are similar to corresponding operations in the logic described in FIGS. 6 and 8. One difference in FIG. 11 is that the path update logic is used to determine if a new path is available based upon the current stream data rate and/or stream medium utilization. If a new path is available, then the stream may be moved. It should be noted that if the hybrid device performing the path update is a relay hybrid device that is relaying packets in the existing path and if the network is limited to a two-hop maximum, then the relay hybrid device may only select new paths that are one-hop to the destination hybrid device. Furthermore, if the ingress interface at the hybrid device is a shared medium and a potential new path includes an egress interface with the same shared medium, then the potential new path is removed from consideration. If no alternative new path is available for a candidate stream, then the candidate stream is skipped and the next candidate stream is used in a further path update process, and so on.

At 1101, a candidate stream is selected for path update. The selected candidate stream may be selected, for example, similar to the process described in FIG. 10. Blocks 1105-1160 are similar to corresponding blocks 805-860 of FIG. 8 and blocks 615-660 of FIG. 6. In the interest of brevity, the distinguishing features are described here, while relying on the descriptions of the previous Figures for common subject matter. At 1105, candidate paths are identified. In FIG. 11, because the logic is performed due to network condition, paths which have failed, congested, or saturated link will not be included as potential new paths. At 1110, the current stream medium utilization is subtracted from links in the current path, so that extended end-to-end capacity calculations better reflect a comparative capacity of the candidate paths. At 1115, available path groups may be defined to group certain paths. At 1120, the list of candidate APGs may be reduced by removing APGs with undesirable paths. At 1125, if there are any candidate APGs that remain after removing APGs with undesirable paths, the process continues to blocks 1135, 1137, 1140, 1150, 1160 in which an APG is selected and a path with the highest end-to-end capacity greater than the SDR from within the selected APG is used for the path update. One difference in this flow is at 1137, if there are no APG that has at least one path having an end-to-end path capacity greater than the current stream data rate, the hybrid device will continue using the current path at 1170 without performing a path update for the particular candidate stream. At 1170, the process continues by adding the SMU back to the medium utilization for the current egress interface and repeating the path update logic for another selected candidate stream.

Figure 12:
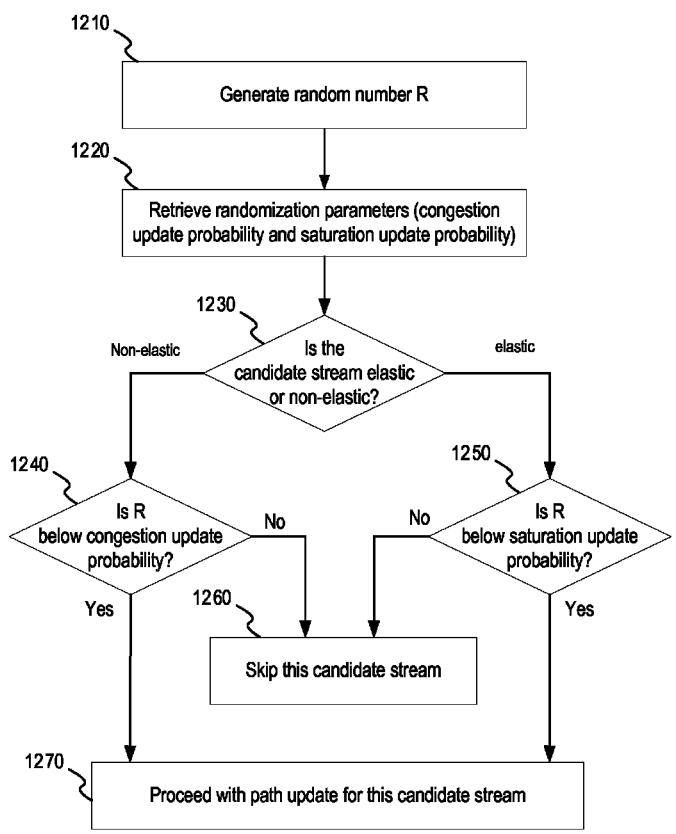
FIG. 12 is a flow diagram illustrating example operations for randomizing path reselection in a hybrid network.

FIG. 12 is a flow diagram illustrating example operations for randomizing path update/reselection. In some implementations, a random operation may be used to selectively update (i.e., move) the paths for the streams. At 1210, a random number R is generated for the candidate stream (e.g., between a range from 0 to 1). At 1220, the hybrid device may retrieve randomization parameters. The random number R is compared with the randomization parameters to determine, semi randomly, a 'yes' or 'no' decision whether to move the stream. The randomization parameters may be configurable thresholds and may be different values for congestion conditions and saturation conditions. At 1230, the hybrid device determines whether the candidate stream is elastic (TCP) or non-elastic (UDP). If the candidate stream is a non-elastic (UDP) stream, then the hybrid device determines whether the random number R is less than or equal to a first configured value (e.g., a "congestion update probability" value, such as 0.6). If the random number R is less than or equal to the first configured value for congestion update probability, then at 1270 the candidate stream is moved. Otherwise, at 1260, the hybrid device skips this particular stream and selects a new candidate stream. At 1230, if the candidate stream is an elastic (TCP) stream, then at 1250 the hybrid device determines if the random number R is less than or equal to a second configured value (e.g., a "saturation update probability" value, such as 0.3). If the random number R is above the second configured value for saturation update probability, then the path may not be updated for that stream at 1260. If the random number R is less than or equal to the second configured value then the path may be updated for the candidate stream at 1270.

The randomization of streams having path updates is introduced to avoid synchronization of streams by multiple hybrid devices in the hybrid network. For example, if a network condition existed without a hold-down timer or randomization process, then it might be possible that several hybrid devices move streams to paths that use the same link. It should be noted that any type of configurable threshold value could be used, and other types of comparisons could be made to achieve a semi-random effect for selecting candidate streams to move.

After a path update for a candidate stream, a hybrid device may wait to perform path update for further candidate streams until link metrics are recalculated and shared among the hybrid devices in the network. Alternatively, a hybrid device may perform load balancing procedures according to a pseudorandom delay or configurable periodic delay (preferably not synchronized with other hybrid devices in the hybrid network).

It should be understood that FIGS. 1-12 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
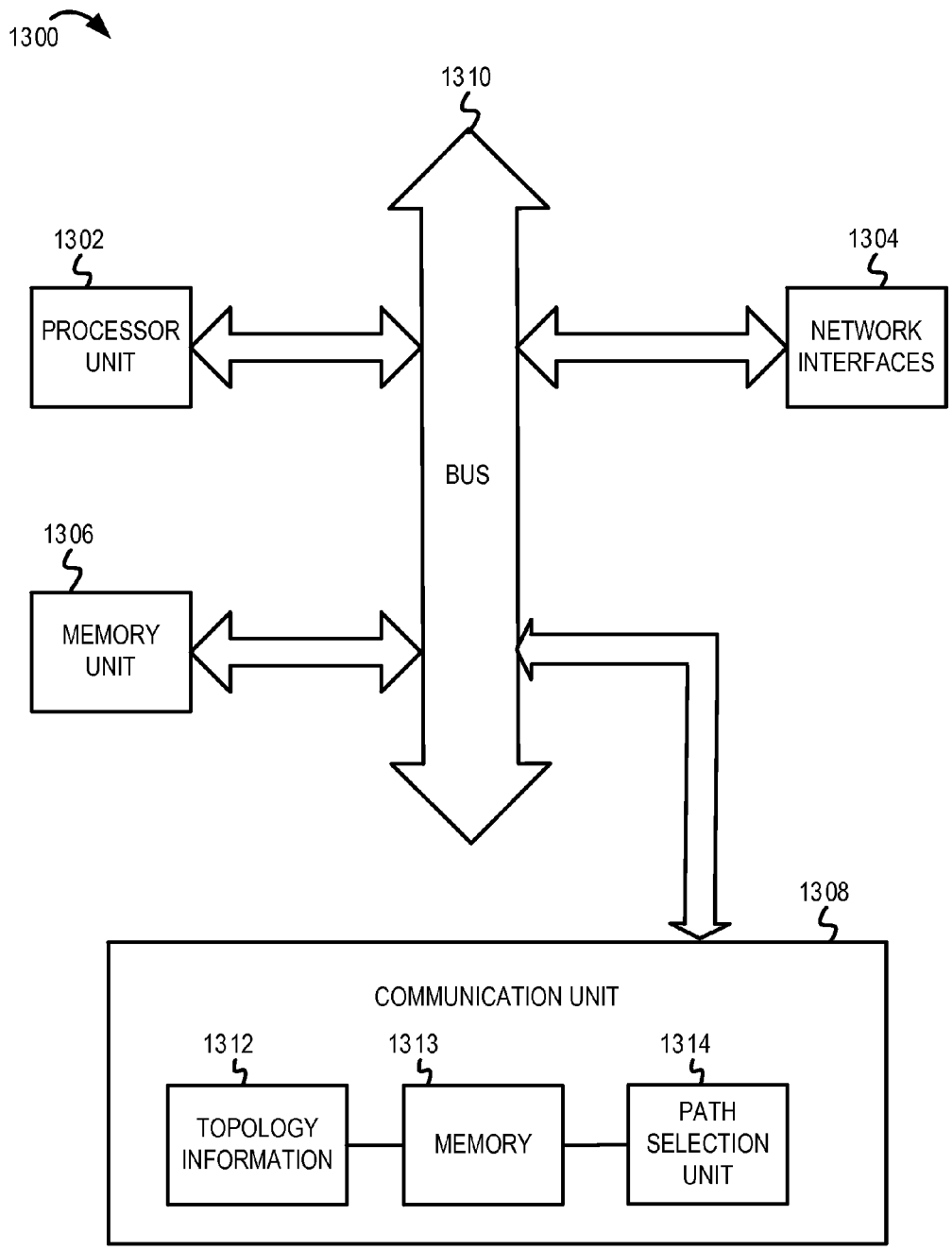
FIG. 13 is an example block diagram of one embodiment of an electronic device including a communication unit for path selection and path update mechanisms.

FIG. 13 is an example block diagram of one embodiment of an electronic device 1300 including a communication unit having path selection or path update mechanisms. In some implementations, the electronic device 1300 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 1300 includes a processor unit 1302 (possibly including multiple processors, multiple cores, multiple nodes, and/or implementing multi-threading, etc.). The electronic device 1300 includes a memory unit 1306. The memory unit 1306 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1300 also includes a bus 1310 (e.g., PCI, ISA, PCI-Express, HyperTransport®, InfiniBand®, NuBus, AHB, AXI, etc.), and network interfaces 1304 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 1300 may support multiple network interfaces—each of which is configured to couple the electronic device 1300 to a different communication network.

The electronic device 1300 also includes a communication unit 1308. The communication unit 1308 may comprise topology information 1312, a path selection unit 1314 and memory 1313. It should be understood, that in some embodiments, the communication unit 1308 may also have a dedicated processor (e.g., such as a communication unit comprising a system on a chip, or board with multiple chips, or multiple boards, in which the communication may have one or more dedicated processor or processing unit(s), in addition to the main processor 1302). As described above in FIGS. 1-12, the path selection unit 1314 may be configured to select a path for a packet stream based upon topology information. The path selection unit 1314 may be configured to store a selected path in a path forwarding table of the memory 1313 for use with subsequent packets of the stream. The path selection unit 1314 may also be configured to perform path update procedures in response to a network condition, such as link failure, topology change, or for load balancing. Any one of these functionalities may be partially (or entirely) implemented in hardware and/or on the processor unit 1302. For example, the functionality may be implemented with an application specific integrated circuit, in logic implemented in the processor unit 1302, in a co-processor on a peripheral device or card, etc. Further, realizations may include fewer or additional components not illustrated in FIG. 13 (e.g., video cards, audio cards, additional network interfaces, peripheral devices, etc.). The processor unit 1302, the memory unit 1306, and the network interfaces 1304 are coupled to the bus

1310. Although illustrated as being coupled to the bus 1310, the memory unit 1306 may be coupled to the processor unit 1302.

While the embodiments are described with reference to various implementations and exploitations, it will be understood that these embodiments are illustrative and that the scope of the inventive subject matter is not limited to them. In general, path selection and path update mechanisms as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for modifying paths in a hybrid network which includes at least one hybrid device that is capable of communicating via multiple communication media, said method comprising:
   identifying, at a hybrid device, a candidate stream that is using a first path that includes an impaired link; and
   selecting a second path to replace the first path for the candidate stream, wherein said selecting the second path comprises,
      for each of at least two available paths between a first hybrid device and a second hybrid device, determining an end-to-end path capacity from the first hybrid device to the second hybrid device, wherein said determining the end-to-end path capacity includes determining whether at least two links in the available path share a same medium; and
      selecting one of the at least two available paths based, at least in part, on the determined end-to-end path capacities.

2. The method of claim 1, further comprising detecting network condition associated with the impaired link, where said detecting includes at least one member selected from the group comprising:
   detecting a link failure associated with the impaired link,
   receiving a topology change notification from a device in the first path,
   receiving a message from a device in the first path, the message indicating a change in link metrics for the impaired link, and
   determining a loading condition for a local interface of the hybrid device.

3. The method of claim 1, wherein said identifying the candidate stream includes detecting at least one entry associated with an impacted stream in a stream forwarding table at the hybrid device, the entry having next hop path information associated with the impaired link.

4. The method of claim 1, wherein said identifying the candidate stream includes, for each entry in a stream forwarding table at the hybrid device, determining whether the entry is associated with a stream that uses a path that includes the impaired link.

5. The method of claim 1, wherein said identifying the candidate stream includes identifying a stream that is associated with an ingress media type different from an egress media type.

6. The method of claim 1, wherein said selecting the second path further comprises selecting a path having a greater end-to-end path capacity than a current stream data rate associated with the candidate stream.

7. The method of claim 1, further comprising:
   gathering topology information about the hybrid network; and
   analyzing the topology information to determine at least one available path for the candidate stream between the first hybrid device and the second hybrid device.

8. The method of claim 1, wherein said selecting the second path further includes:
   determining a difference between a stream medium utilization (SMU) associated with the candidate stream and a medium utilization (MU) measured for an interface at the hybrid device that is in the first path; and
   determining a path capacity for the interface at the hybrid device based, at least in part, on a result of said difference between the SMU and the MU.

9. The method of claim 1, wherein, said selecting the second path further includes:
   selecting a path that does not exceed a maximum hop count associated with the hybrid network.

10. The method of claim 1, wherein the method further comprises:
    dropping packets for the candidate stream in response to the number of hops of each of the at least two available paths exceed a threshold.

11. The method of claim 1, wherein the impaired link is congested due to overloading of non-elastic streams, and said identifying the candidate stream includes identifying a stream that is non-elastic.

12. The method of claim 1, wherein the impaired link is saturated due to overloading of elastic streams, and said identifying the candidate stream includes identifying a stream that is elastic.

13. The method of claim 1, wherein a stream forwarding table at the hybrid device includes a forwarding decision timestamp for each entry, and wherein identifying the candidate stream includes identifying a stream associated with a forwarding decision timestamp greater than a minimum time period.

14. The method of claim 1, further comprising:
    identifying, at the hybrid device, a second stream to a same destination as the candidate stream; and
    updating the second stream to use the second path.

15. The method of claim 1, further comprising:
    updating an entry for the candidate stream in a stream forwarding table, the updated entry indicating updated next hop information associated with the second path; and
    forwarding subsequent packets for the candidate stream based, at least in part, on the updated entry.

16. The method of claim 15, further comprising:
    generating a pseudorandom number for the candidate stream; and
    wherein said updating and forwarding are based, at least in part, on the pseudorandom number.

17. The method of claim 16, further comprising:
comparing the pseudorandom number to a configurable threshold value to determine whether to perform said updating and forwarding.

18. A hybrid device comprising:
at least one local interface capable of communicating via a hybrid network that includes at least one hybrid device that is capable of communicating via multiple communication media;
a memory configured to store topology information associated with the hybrid network;
a path selection unit configured to,
identify a candidate stream that is using a first path that includes an impaired link; and
select a second path to replace the first path for the candidate stream by,
for each of at least two available paths between a first hybrid device and a second hybrid device, determining an end-to-end path capacity from the first hybrid device to the second hybrid device, wherein said determining the end-to-end path capacity includes determining whether at least two links in the available path share a same medium; and
selecting one of the at least two available paths based, at least in part, on the determined end-to-end path capacities.

19. The first hybrid device of claim 18, further comprising a topology management unit configured to detect a network condition associated with the impaired link, wherein said topology management unit is further configured to:
detect a link failure associated with the impaired link;
receive a topology change notification from a device in the first path;
receive a message from a device in the first path, the message indicating a change in link metrics for the impaired link; and
determine a loading condition for a local interface of the hybrid device.

20. The hybrid device of claim 18, wherein the path selection unit is configured to detect at least one entry associated with an impacted stream in a stream forwarding table at the hybrid device, the entry having next hop path information associated with the impaired link.

21. The hybrid device of claim 18, wherein the path selection unit is configured to:
for each entry in a stream forwarding table at the hybrid device, determine whether the entry is associated with a stream that uses a path that includes the impaired link.

22. The hybrid device of claim 18, wherein the path selection unit is configured to:
identify a stream that is associated with an ingress media type different from an egress media type.

23. The hybrid device of claim 18, wherein the impaired link is congested due to overloading of non-elastic streams, and the path selection unit is configured to identify a stream that is non-elastic.

24. The hybrid device of claim 18, wherein the impaired link is saturated due to overloading of elastic streams, and the path selection unit is configured to identify a stream that is elastic.

25. The hybrid device of claim 18, wherein the path selection unit is further configured to:
identify a second stream to a same destination as the candidate stream; and
update the second stream to use the second path.

26. The hybrid device of claim 18, wherein the path selection unit is further configured to:
update an entry for the candidate stream in a stream forwarding table, the updated entry indicating updated next hop information associated with the second path; and
forward subsequent packets for the candidate stream based, at least in part, on the updated entry.

27. The hybrid device of claim 18, wherein the path selection unit is further configured to:
generate a pseudorandom number for the candidate stream; and
update the entry in a stream forwarding table based, at least in part, on the pseudorandom number.

28. The hybrid device of claim 27, wherein the path selection unit is further configured to:
compare the pseudorandom number to a configurable threshold value to determine whether to update the entry.

29. A non-transitory computer readable medium storing computer program code, the computer program code comprising instructions which when executed by a processor of a hybrid device cause the hybrid device to:
detect, a network condition in a hybrid network which includes at least one hybrid device that is capable of communicating via multiple communication media, the network condition associated with an impaired link;
identify, a candidate stream that is using a first path that includes the impaired link; and
select a second path to replace the first path for the candidate stream by,
for each of at least two available paths between a first hybrid device and a second hybrid device, determining an end-to-end path capacity from the first hybrid device to the second hybrid device, wherein said determining an end-to-end path capacity includes determining whether at least two links in the available path share a same medium; and
selecting one of the at least two available paths based, at least in part, on the determined end-to-end path capacities.

* * * * *